United States Patent
Liu et al.

(10) Patent No.: US 12,028,199 B2
(45) Date of Patent: Jul. 2, 2024

(54) SEQUENCE-BASED SIGNAL PROCESSING METHOD AND APPARATUS

(71) Applicant: HUAWEI TECHNOLOGIES CO., LTD., Guangdong (CN)

(72) Inventors: Xianda Liu, Beijing (CN); Mingxin Gong, Beijing (CN); Bingyu Qu, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 136 days.

(21) Appl. No.: 17/361,720

(22) Filed: Jun. 29, 2021

(65) Prior Publication Data
US 2021/0328842 A1  Oct. 21, 2021

Related U.S. Application Data

(63) Continuation of application No. PCT/CN2020/070821, filed on Jan. 8, 2020.

(30) Foreign Application Priority Data

Jan. 9, 2019 (CN) .................. 201910020924.0

(51) Int. Cl.
H04L 27/26 (2006.01)
H04J 13/00 (2011.01)
H04L 25/02 (2006.01)

(52) U.S. Cl.
CPC ........ *H04L 27/265* (2013.01); *H04J 13/0062* (2013.01); *H04L 27/2613* (2013.01); *H04L 25/0224* (2013.01); *H04L 27/2614* (2013.01)

(58) Field of Classification Search
CPC .............. H04J 13/0062; H04L 27/265; H04L 27/2613; H04L 27/2614; H04L 25/0224
See application file for complete search history.

(56) References Cited

U.S. PATENT DOCUMENTS

| | | | |
|---|---|---|---|
| 2018/0302905 A1 | 10/2018 | Fodor et al. | |
| 2019/0150175 A1* | 5/2019 | Qu ................... | H04L 27/2614 370/329 |

FOREIGN PATENT DOCUMENTS

| | | |
|---|---|---|
| CN | 101005478 A | 7/2007 |
| CN | 106664279 A | 5/2017 |
| CN | 108833070 A | 11/2018 |

(Continued)

OTHER PUBLICATIONS

Office Action issued in Chinese Application No. 202011563803.X dated Jan. 20, 2022, 4 pages.

(Continued)

*Primary Examiner* — Elton Williams
(74) *Attorney, Agent, or Firm* — Fish & Richardson P.C.

(57) ABSTRACT

This application provides a sequence-based signal processing method and apparatus. An example signal processing method includes: determining a sequence $\{x_n\}$ including N elements, where N is equal to 18 and the sequence $\{x_n\}$ satisfies a preset condition; generating a first signal based on the sequence $\{x_n\}$; and sending the first signal.

18 Claims, 9 Drawing Sheets

(56) References Cited

FOREIGN PATENT DOCUMENTS

| CN | 109039979 A | 12/2018 |
|---|---|---|
| CN | 109802820 A | 5/2019 |
| CN | 112532368 A | 3/2021 |
| WO | 2017092697 A1 | 6/2017 |
| WO | 2019096268 A1 | 5/2019 |

OTHER PUBLICATIONS

3GPP TS 38.211 V15.3.0 (Sep. 2018), "3rd Generation Partnership Project; Technical Specification Group Radio Access Network;NR;Physical channels and modulation(Release 15)," Sep. 2018, 96 pages.

Huawei, HiSilicon, "Design of UL DMRS sequence for data transmission," 3GPP TSG RAN WG1 Meeting #91, R1-1720635, Reno, USA, Nov. 27-1 Dec. 1, 2017, 11 pages.

Office Action issued in Chinese Application No. 202011563803.X dated Jun. 23, 2021, 8 pages.

PCT International Search Report and Written Opinion issued in International Application No. PCT/CN2020/070821 dated Apr. 9, 2020, 16 pages (with English translation).

SoftBank Corp., "Pseudo-CR on SRv6 Impact on N4," 3GPP TSG CT WG4 Meeting #86-bis, C4-187224, Vilnius, Lithuania, Oct. 15-19, 2018, 3 pages.

Office Action in Chinese Appln. No. 201910020924.0, dated Apr. 24, 2023, 8 pages.

Extended European Search Report issued in European Application No. 20738420.7 dated Jan. 14, 2022, 9 pages.

Intel Corporation, "Low PAPR Reference Signals," 3GPP TSG RAN WG1 Meeting #95, R1-1813892, Spokane, UA, Nov. 12-16, 2018, 14 pages.

InterDigital, Inc., "Remaining issues on DMRS," 3GPP TSG RAN WG1 Meeting R1#91, R1-1720633, Reno USA, Nov. 27-Dec. 1, 2017, 14 pages.

Huawei et al., "Sequence design for Pi/2-BPSK OFT S-OFDM," 3GPP TSG RAN WG1 Meeting #95, R1-1814086, Spokane, USA, Nov. 12-16, 2018, 8 pages.

* cited by examiner

SEQUENCE-BASED SIGNAL PROCESSING METHOD AND APPARATUS

CROSS-REFERENCE TO RELATED APPLICATIONS

This application is a continuation of International Application No. PCT/CN2020/070821, filed on Jan. 8, 2020, which claims priority to Chinese Patent Application No. 201910020924.0, filed on Jan. 9, 2019. The disclosures of the aforementioned applications are hereby incorporated by reference in their entireties.

TECHNICAL FIELD

This application relates to the field of communications technologies, and in particular, to a sequence-based signal processing method and apparatus.

BACKGROUND

In a long term evolution (LTE) system, a demodulation reference signal (DMRS) is used to perform channel estimation, and to further perform signal demodulation, Currently, the DMRS may be obtained based on a Gold sequence, a computer generated sequence (CGS), or a Zadoff-Chu sequence (ZC sequence).

In a new radio access technology (NR), a discrete fourier transform spread orthogonal frequency division multiplexing multiple access (DFT-s-OFDM) waveform, and a it $\pi/2$ binary phase shift keying (BPSK) modulation scheme may be supported in being used on a physical uplink shared channel (PUSCIT).

When the DFT-s-OFDM waveform and the $\pi/2$ BPSK modulation scheme are used for an uplink DMRS, if a Gold-sequence-based sequence or a CGS-sequence-based sequence is used for the DMRS, frequency domain flatness of the sequence may be relatively poor, and this is unfavorable for the channel estimation; if the ZC sequence is used for the DMRS, a peak-to-average power ratio (PAPR) of the DMRS is greater than a PAPR of transmitted data, and consequently, out-of-band spurious emission and in-band signal loss of a pilot signal are caused, and performance of the channel estimation is further affected.

Therefore, the sequences used for the existing DMRS cannot meet a requirement of a communication application environment in which a reference signal is sent on the PUSCH.

SUMMARY

This application provides a sequence-based signal processing method and apparatus. A sequence that can satisfy a condition that frequency domain flatness of a sequence is relatively good and a PAPR value is relatively small is provided, and a first signal is generated based on the sequence. When the first signal is a reference signal of a signal carried on a PUSCH, the relatively good frequency domain flatness of the sequence, and the relatively small PAPR value may be maintained for the sent first signal. Therefore, a requirement of a communication application environment in which the reference signal is sent can be met.

According to a first aspect, a sequence-based signal processing method is provided, where the signal processing method includes: determining a sequence $\{x_n\}$ including N elements, where N is equal to 18, $x_n$ is an element in the sequence $\{x_n\}$, and the sequence $\{x_n\}$ satisfies a preset condition; generating a first signal based on the sequence $\{x_n\}$; and sending the first signal.

The preset condition is as follows: $x_n = y_{(n+M) mod N}$, where n traverses 0, 1, . . . N−1. For example, n may represent an index of each element in the sequence $\{x_n\}$. $M \in \{0, 1, 2, \ldots, N-1\}$, and it should be understood that M may be an integer less than N. $y_n = A \cdot b_n \cdot j^{n mod 2}$, where A is a non-zero complex number, the element $b_n = u \cdot (1-2 \cdot s_n)$, u is a non-zero complex number, $j = \sqrt{-1}$, and a set of sequences $\{s_n\}$ including the element $s_n$ includes at least one sequence in a first sequence set.

A value of u in $b_n = u \cdot (1-2 \cdot s_n)$ is not fixed. For example, values of u may be the same for all elements in a same currently selected sequence, and values of u may be different for elements in different sequences.

A value of M in $x_n = y_{(n+M) mod N}$ varies in different cases. When elements in a same sequence are determined, the value of M is constant and fixed. When another sequence is determined, the value of M may be 1 or another integer less than N.

Sequences in the first sequence set include:
{1, 0, 1, 1, 0, 1, 1, 1, 0, 0, 0, 0, 0, 1, 1, 1, 0, 0}, {1, 1, 0, 0, 0, 1, 0, 0, 1, 0, 1, 1, 0, 0, 0, 1, 1, 1},
{1, 0, 1, 1, 0, 0, 1, 0, 1, 0, 1, 0, 0, 1, 0, 0, 0, 1}, {1, 1, 1, 1, 1, 0, 0, 0, 0, 0, 0, 0, 1, 1, 0, 0, 0},
{1, 1, 1, 1, 0, 0, 0, 0, 0, 1, 1, 0, 0, 1, 1, 1}, {1, 1, 1, 1, 0, 0, 1, 0, 0, 0, 0, 0, 1, 0, 0, 0, 1},
{1, 1, 1, 0, 0, 0, 0, 1, 0, 0, 0, 0, 0, 1, 0, 0, 1, 1}, {1, 1, 1, 1, 0, 0, 0, 0, 0, 0, 1, 1, 0, 0, 0, 0, 1, 1},
{1, 1, 1, 1, 1, 0, 0, 0, 0, 0, 1, 1, 0, 1, 0, 0, 0, 0}, {1, 1, 1, 1, 1, 0, 0, 0, 0, 0, 1, 1, 1, 0, 1, 0, 0, 1},
{1, 0, 0, 1, 1, 1, 1, 0, 1, 1, 0, 1, 1, 1, 0, 0, 0, 0}, {1, 1, 0, 0, 0, 1, 0, 1, 1, 0, 0, 0, 1, 0, 1, 1, 0, 1},
{1, 0, 0, 1, 0, 1, 0, 1, 0, 0, 1, 1, 1, 1, 0, 0, 0, 0}, {1, 1, 1, 1, 0, 0, 0, 0, 1, 1, 0, 1, 1, 0, 0, 0, 0, 1},
{1, 0, 0, 1, 1, 1, 0, 0, 0, 0, 1, 1, 1, 1, 1, 0, 0, 0}, {1, 1, 1, 1, 0, 0, 1, 0, 0, 1, 1, 1, 0, 0, 0, 0, 0},
{1, 1, 0, 1, 0, 1, 1, 0, 1, 0, 0, 1, 1, 1, 0, 0, 1, 0}, {1, 0, 1, 0, 0, 1, 1, 1, 1, 1, 0, 0, 0, 0, 0, 1, 0, 0}, and
{1, 0, 1, 1, 0, 1, 1, 1, 1, 1, 0, 0, 0, 0, 0, 1, 1, 0}.

A simulation result shows that sequences $\{x_n\}$ that correspond to the sequences described above and equivalent sequences of the sequences after $\pi/2$ BPSK modulation is performed on the sequences and the equivalent sequences of the sequences may satisfy the following conditions.

Condition 1: Time-domain filtering is used. When a filtering coefficient is [0.1, 1, 0.1], a PAPR is less than 2.89 dB. When a filtering coefficient is [0.16, 1, 0.16], a PAPR is less than 2.35 dB. When a filtering coefficient is [0.22, 1, 0.22], a PAPR is less than 1.76 dB. When a filtering coefficient is [0.28, 1, 0.28], a PAPR is less than 1.27 dB, Condition 2: For a frequency domain sequence corresponding to the sequences $\{x_n\}$, a maximum normalized power is less than 0.5 dB, and a minimum normalized power is greater than −0.5 dB. That is, frequency domain flatness of the sequences $\{x_n\}$ is relatively-good.

For example, when a modulation scheme of the first signal is $\pi/2$ BPSK, the first signal may also satisfy the foregoing condition 1 and condition 2.

It should be understood that, a relatively small PAPR of the sent first signal may help reduce energy consumption of a transmitter side (such as a terminal device), and relatively good frequency domain flatness of the sent first signal is advantageous to improving performance of performing channel estimation by using the first signal.

Therefore, in this embodiment of this application, the first signal is generated based on the sequence $\{x_n\}$. The sequence $\{x_n\}$ may satisfy a condition in which frequency domain flatness of a sequence is relatively good and a PAPR value is relatively small, so that when the first signal is a reference signal of a signal carried on a PUSCH, the relatively good frequency domain flatness of the sequence, and the relatively small PAPR value may be maintained for the sent first signal. Therefore, a requirement of a communication application environment in which the reference signal is sent can be met.

For example, the modulation scheme of the first signal is the π/2 BPSK.

In a possible design, the first signal is a reference signal, or the first signal is used to carry communication information.

With reference to the first aspect, in a possible implementation of the first aspect, the first signal is a reference signal of a second signal, and a modulation scheme of the second signal is π/2 binary phase shift keying (BPSK).

For example, the second signal is carried on a shared channel.

With reference to the first aspect, in a possible implementation of the first aspect, the set of the sequences $\{s_n\}$ includes at least one sequence in a second sequence set, and the second sequence set includes some or all of the sequences that are in the first sequence set.

With reference to the first aspect, in a possible implementation of the first aspect, the generating a first signal based on the sequence $\{x_n\}$ includes: performing discrete fourier transform on the N elements that are in the sequence $\{x_n\}$, to obtain a sequence $\{f_n\}$ including N elements; respectively mapping the N elements in the sequence $\{f_n\}$ to N subcarriers, to obtain a frequency domain signal including N elements; and generating the first signal based on the frequency domain signal.

With reference to the first aspect, in a possible implementation of the first aspect, the N subcarriers are N consecutive subcarriers or N evenly spaced subcarriers.

With reference to the first aspect, in a possible implementation of the first aspect, before the performing discrete fourier transform on the N elements that are in the sequence $\{x_n\}$, the first signal processing method further includes: filtering the sequence $\{x_n\}$; or after the performing discrete fourier transform on the N elements that are in the sequence $\{x_n\}$, the first signal processing method further includes: filtering the sequence $\{x_n\}$.

In a possible design, the set of the sequences $\{s_n\}$ including the element $s_n$ includes at least a first sequence that is in the first sequence set, or an equivalent sequence of a first sequence that is in the first sequence set.

In a possible design, the equivalent sequence is $\{q_n\}$, and an element $q_n$ in the equivalent sequence $\{q_n\}$ satisfies $q_n = s_{(n+M) mod N}$, where $M \in \{0,1,2, \ldots, N-1\}$, and N is a sequence length.

According to a second aspect, a sequence-based signal processing method is provided, where the signal processing method includes: receiving a first signal, to obtain N elements in a sequence $\{x_n\}$, where N is equal to 18, $x_n$ is an element in the sequence $\{x_n\}$, the sequence $\{x_n\}$ satisfies a preset condition, the preset condition is as follows: $x_n = y_{(n+M) mod N}$, a value of n ranges from 0 to N-1, $M \in \{0,1, 2, \ldots, N-1\}$, and $y_n = A \cdot b_n \cdot j^{n mod 2}$, where A is a non-zero complex number, the element $b_n = u \cdot (1-2 \cdot s_n)$, u is a non-zero complex number, $j = \sqrt{-1}$, and a set of sequences $\{s_n\}$ including the element $s_n$ includes at least one sequence in a first sequence set; and processing the first signal based on the N elements that are in the sequence $\{x_n\}$.

Sequences in the first sequence set include:
{1, 0, 1, 1, 0, 1, 1, 1, 0, 0, 0, 0, 0, 1, 1, 1, 0, 0}, {1, 1, 0, 0, 0, 1, 0, 0, 1, 0, 1, 1, 0, 0, 0, 1, 1, 1},
{1, 0, 1, 1, 0, 0, 1, 0, 1, 0, 1, 0, 0, 1, 0, 0, 0, 1}, {1, 1, 1, 1, 1, 1, 0, 0, 0, 0, 0, 0, 0, 1, 1, 0, 0, 0},
{1, 1, 1, 1, 0, 0, 0, 0, 0, 0, 1, 1, 1, 0, 0, 1, 1, 1}, {1, 1, 1, 1, 0, 0, 1, 0, 0, 0, 0, 0, 1, 0, 0, 0, 0, 1},
{1, 1, 1, 0, 0, 0, 0, 1, 0, 0, 0, 0, 0, 1, 0, 0, 1, 1}, {1, 1, 1, 1, 0, 0, 0, 0, 0, 0, 1, 1, 0, 0, 0, 0, 1, 1},
{1, 1, 1, 1, 1, 0, 0, 0, 0, 0, 0, 1, 1, 0, 1, 0, 0, 0}, {1, 1, 1, 1, 1, 0, 0, 0, 0, 0, 0, 1, 1, 1, 0, 1, 0, 0, 0, 1},
{1, 0, 0, 1, 1, 1, 1, 0, 1, 1, 0, 1, 1, 1, 0, 0, 0, 0}, {1, 1, 0, 0, 0, 1, 0, 1, 0, 0, 0, 1, 0, 1, 1, 0, 1},
{1, 0, 0, 0, 1, 0, 1, 0, 1, 0, 1, 1, 1, 1, 0, 0, 0}, {1, 1, 1, 1, 0, 0, 0, 1, 1, 0, 1, 1, 0, 0, 0, 0, 1},
{1, 0, 0, 1, 1, 1, 0, 0, 0, 0, 1, 1, 1, 1, 1, 0, 0}, {1, 1, 1, 1, 0, 0, 1, 0, 0, 1, 1, 1, 1, 0, 0, 0, 0, 0},
{1, 1, 0, 1, 0, 1, 1, 0, 1, 0, 0, 1, 1, 1, 0, 0, 1, 0}, {1, 0, 1, 0, 0, 1, 1, 1, 1, 1, 0, 0, 0, 0, 1, 0, 0}, and
{1, 0, 1, 1, 0, 1, 1, 1, 1, 1, 0, 0, 0, 0, 0, 1, 1, 0}.

Therefore, in this embodiment of this application, the first signal is generated based on the sequence $\{x_n\}$. The sequence $\{x_n\}$ may satisfy a condition in which frequency domain flatness of a sequence is relatively good and a PAPR value is relatively small, so that when the first signal is a reference signal of a signal carried on a PUSCH, the relatively good frequency domain flatness of the sequence, and the relatively small PAPR value play be maintained for the sent first signal. Therefore, a requirement of a communication application environment in which the reference signal is sent can be met.

With reference to the second aspect, in a possible implementation of the second aspect, the set of the sequences $\{s_n\}$ includes at least one sequence in a second sequence set, and the second sequence set includes some or all of the sequences that are in the first sequence set.

With reference to the second aspect, in a possible implementation of the second aspect, the receiving a first signal, to obtain N elements in a sequence $\{x_n\}$ includes: obtaining the first signal on N consecutive subcarriers, or obtaining the first signal on N evenly spaced subcarriers, obtaining N elements in a sequence $\{f_n\}$, where N is a positive integer greater than 1, the first signal is generated by mapping the sequence $\{f_n\}$ to the N subcarriers, and $f_n$ is an element in the sequence $\{f_n\}$, and performing inverse discrete fourier transform on the sequence $\{f_n\}$, to obtain the N elements that are in the sequence $\{x_n\}$.

With reference to the second aspect, in a possible implementation of the second aspect, the first signal is a reference signal of a second signal, and a modulation scheme of the second signal is π/2 binary phase shift keying BPSK.

In a possible design, the set of the sequences $\{s_n\}$ including the element s includes at least a first sequence that is in the first sequence set, or an equivalent sequence of a first sequence that is in the first sequence set.

In a possible design, the equivalent sequence is $\{q_n\}$, and an element $q_n$ in the equivalent sequence $\{q_n\}$ satisfies $q_n = s_{(n+M) mod N}$, where $M \in \{0,1,2, \ldots, N-1\}$, and N is a sequence length.

Optionally, in addition to the foregoing sequences, the first sequence set may further include another feasible sequence with a length of 18.

For example, the first sequence set may further include a sequence: {1, 1, 0, 1, 1, 0, 1, 0, 1, 1, 0, 0, 0, 0, 0, 0, 0, 1}.

According to a third aspect, a signal processing apparatus is provided, where the signal processing apparatus may be a communications device, or may be a chip in a communications device, and the communications device or the chip has a function of implementing the sequence-based signal processing method according to any one of the first aspect or the possible designs of the first aspect. The function may be implemented by using hardware, or implemented by using hardware executing corresponding software. The hardware or the software includes one or more units corresponding to the foregoing function.

The communications device includes a processing unit and a transceiver unit. The processing unit may be a processor, the transceiver unit may be a transceiver, and the transceiver includes a radio frequency circuit. Optionally, the communications device further includes a storage unit, and the storage unit may be, for example, a memory. When the communications device includes the storage unit, the storage unit is configured to store a computer-executable instruction, the processing unit is connected to the storage unit, and the processing unit executes the computer-executable instruction stored in the storage unit, so that the communications device performs the sequence-based signal processing method according to any one of the first aspect or the possible designs of the first aspect.

The chip includes a processing unit and a transceiver unit. The processing unit may be a processor, and the transceiver unit may be an input/output interface, a pin, a circuit, or the like on the chip, The processing unit may execute the computer-executable instruction stored in the storage unit, so that the chip performs the sequence-based signal processing method according to any one of the first aspect or the possible designs of the first aspect, Optionally, the storage unit may be a storage unit (for example, a register or a buffer) in the chip, or the storage unit may be a storage unit (for example, a read-only memory (ROM)) that is in the communications device and that is located outside the chip, another type of static storage device (for example, a random access memory (RAM)) that can store static information and an instruction, or the like.

The processor mentioned in the third aspect may be a central processing unit (CPU), a microprocessor, or an application-specific integrated circuit (ASIC), or may be one or more integrated circuits for controlling program execution of the sequence-based signal processing method according to any one of the first aspect or the possible designs of the first aspect.

According to a fourth aspect, a signal processing apparatus is provided, where the signal processing apparatus may be a communications device, or may be a chip in a communications device, and the communications device or the chip has a function of implementing the sequence-based signal processing method according to any one of the second aspect or the possible designs of the second aspect. The function may be implemented by using hardware, or implemented by using hardware executing corresponding software, The hardware or the software includes one or more units corresponding to the foregoing function.

The communications device includes a processing unit and a transceiver unit. The processing unit may be a processor, the transceiver unit may be a transceiver, and the transceiver includes a radio frequency circuit. Optionally, the communications device further includes a storage unit, and the storage unit may be, for example, a memory. When the communications device includes the storage unit, the storage unit is configured to store a computer-executable instruction, the processing unit is connected to the storage unit, and the processing unit executes the computer-executable instruction stored in the storage unit, so that the communications device performs the sequence-based signal processing method according to any one of the second aspect or the possible designs of the second aspect.

The chip includes a processing unit and a transceiver unit. The processing unit may be a processor, and the transceiver unit may be an input/output interface, a pin, a circuit, or the like on the chip. The processing unit may execute the computer-executable instruction stored in the storage unit, so that the chip performs the sequence-based signal processing method according to any one of the second aspect or the possible designs of the second aspect. Optionally, the storage unit may be a storage unit (for example, a register or a buffer) in the chip, or the storage unit may be a storage unit (for example, a read-only memory (ROM)) that is in the communications device and that is located outside the chip, another type of static storage device (for example, a random access memory (RAM)) that can store static information and an instruction, or the like.

The processor mentioned in the fourth aspect may be a central processing unit (CPU), a microprocessor, or an application-specific integrated circuit (ASIC), or may be one or more integrated circuits for controlling program execution of the sequence-based signal processing method according to any one of the second aspect or the possible designs of the second aspect.

According to a fifth aspect, a communications system is provided, where the communications system includes the signal processing apparatus provided in the third aspect of the embodiments of this application, and the signal processing apparatus provided in the fourth aspect of the embodiments of this application.

According to a sixth aspect, a computer-readable storage medium is provided, where a computer program is stored in the computer-readable storage medium, and when the computer program is executed by a computer, the computer is enabled to implement the method according to any possible implementation of the first aspect or the second aspect.

According to a seventh aspect, a computer program product including an instruction is provided, where when the instruction is executed by a computer, the computer is enabled to implement the method according to any possible implementation of the first aspect or the second aspect.

Therefore, in the embodiments of this application, the first signal is generated based on the sequence $\{x_n\}$. The sequence $\{x_n\}$ may satisfy the condition in which the frequency domain flatness of the sequence is relatively good and the PAPR value is relatively small, so that when the first signal is the reference signal of the signal carried on the PUSCH, the relatively good frequency domain flatness of the sequence, and the relatively small PAPR value may be maintained for the sent first signal. Therefore, the requirement of the communication application environment in which the reference signal is sent can be met.

DESCRIPTION OF EMBODIMENTS

Figure 1:
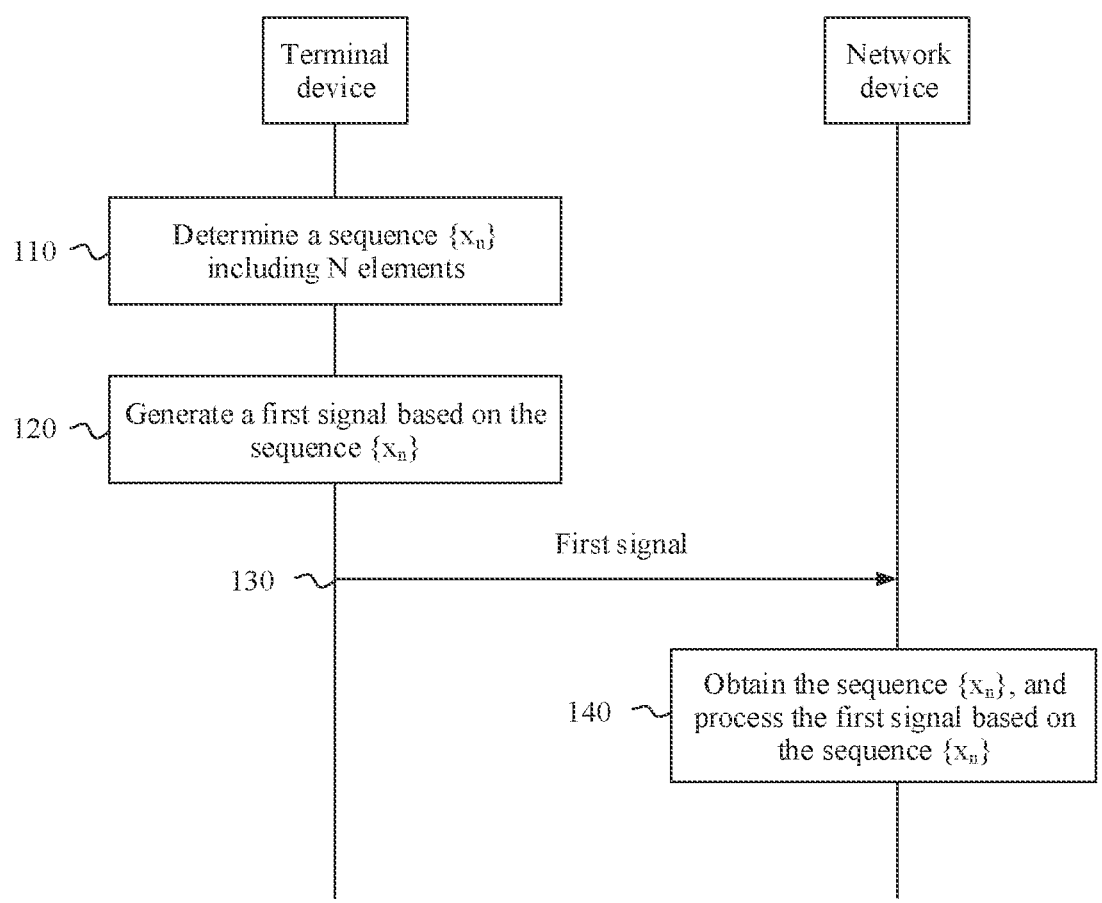
FIG. 1 is a schematic flowchart of a sequence-based signal processing method according to an embodiment of this application.

The following describes technical solutions of this application with reference to the accompanying drawings.

Unless otherwise defined, all technical and scientific terms used in this specification have a same meaning as usually understood by a person skilled in the art of this application. The terms used in the specification of this application are merely for the purpose of describing specific embodiments, and are not intended to limit this application.

In descriptions of the embodiments of this application, unless otherwise specified, "a plurality of" means two or more than two. In addition, for convenience of clear description of the technical solutions in the embodiments of this application, in the embodiments of this application, words such as "first", "second", and the like are used to distinguish between same objects or similar objects whose functions and purposes are basically the same. A person skilled in the art may understand that the terms such as "first" and "second" do not constitute a limitation on a quantity or an execution sequence, and that the terms such as "first" and "second" do not indicate a definite difference. In addition, the terms "include" and "have" in the embodiments of this application are not exclusive. For example, a process, method, system, product, or device including a series of steps or modules is not limited to the listed steps or modules, and may further include a step or module that is not listed.

In a communications system, a channel estimation matrix is usually obtained through calculation using a reference signal, to demodulate data information. Currently, in an LTE system, a 4G system, a 4.5G system, a 5G system, and an NR system or an NR similar scenario, a DFT-s-OFDM waveform and a π/2 BPSK modulation scheme are supported in being used for a DMRS used on a PUSCH (the DMRS used on the PUSCH may be referred to as an uplink DMRS).

When the DFT-s-OFDM waveform and the π/2 BPSK modulation scheme are used for the DMRS, a Gold-sequence-based sequence and a CGS-based sequence are supported in being used for the DMRS. However, in the scenario, when the Gold-sequence-based sequence and the CGS-based sequence are used for the DMRS, if proper filtering cannot be performed, frequency flatness of the sequence is relatively poor, and this is not advantageous to performing channel estimation.

Currently, in NR, a ZC-sequence-based sequence is supported in being used for the DMRS. The ZC sequence satisfies a constant amplitude zero auto-correlation (CAZAC) sequence property. A periodicity of the ZC sequence is a length of the sequence, and the ZC sequence satisfies a centrosymmetry property. In addition, the ZC sequence has great self-correlation and cross-correlation. However, in the foregoing scenario, when the ZC-sequence-based sequence is used for the DMRS, a PAPR of the DMRS is greater than a PAPR of transmitted data. Consequently, out-of-band spurious emission and in-band signal loss of a pilot signal is caused, and channel estimation performance is affected, or uplink coverage is limited.

To ensure that relatively good frequency domain flatness of a sequence, and a relatively small PAPR value are maintained for a sequence used tier the DMRS in the LTE system, the 4G system, the 4.5G system, the 5G system, the NR system or the NR similar scenario, or even in another communications system or communication application environment that has a higher requirement, the embodiments of this application provide a sequence-based signal processing method and apparatus.

In the embodiments of this application, the sequence-based signal processing method is mainly described from a receiver side and a transmitter side in the communications system or the communications application environment. The receiver side may be a network device, and the transmitter side may be a terminal device. Alternatively, the receiver side may be a terminal device, and the transmitter side may be a network device. For ease of understanding and description, in the following embodiments, an example in which the receiver side is the network device, and the transmitter side is the terminal device is used for description. However, this application is not limited thereto.

The terminal device in the embodiments of this application may be user equipment. The user equipment may be a wired device, or may be a wireless device. The wireless device may be a handheld device having a wireless connection function, another processing device connected to a wireless modem, or a mobile terminal that communicates with one or more core networks through a radio access network. For example, the wireless terminal may be a mobile telephone, a mobile phone, a computer, a tablet computer, a personal digital assistant (PDA), a mobile internet device (MID), a wearable device, an electronic reader, or the like. For another example, the wireless terminal may alternatively be a portable, a pocket-sized, a handheld, a computer built-in, or an in-vehicle mobile device. For still another example, the wireless terminal may be a mobile station or an access point.

The network device in the embodiments of this application may be a base station. The base station may include macro base stations, micro base stations, relay nodes, access points, base station controllers, transmission reception points, and the like that are in various forms. In systems in which different radio access technologies are used, specific names of the base station may be different.

A demodulation reference signal in the embodiments of this application is a reference signal that can be used to demodulate data or signaling. Based on different transmission directions, demodulation reference signals may be classified into an uplink demodulation reference signal and a downlink demodulation reference signal. The demodulation reference signal may be a DMRS in the LTE protocol or the NR protocol, or may be another reference signal that is defined in a future protocol and that is used to implement a same or similar function. This is not limited in the embodiments of this application.

In the LTE or NR protocol, the DMRS may be carried on a physical shared channel and sent together with a data signal, to demodulate the data signal carried on the physical shared channel. For example, the DMRS is sent together with downlink data on a physical downlink shared channel (PDSCH), or the DMRS is sent together with uplink data on the physical uplink shared channel (PUSCH). The DMRS may alternatively be carried on a physical control channel and sent together with control signaling, to demodulate the control signaling carried on the physical control channel. For example, the DMRS is sent together with downlink control signaling on a PDCCH, or the DMRS is sent together with uplink control signaling on a PUCCH.

In the embodiments of this application, the demodulation reference signal may include the downlink demodulation reference signal used for demodulation on the PDCCH or the PDSCH, or may include the uplink demodulation reference signal used for demodulation on the PUCCH or the PUSCH. For ease of description below, the demodulation reference signal is referred to as the DMRS for short.

FIG. 1 is a schematic interaction diagram of a sequence-based signal processing method 100 according to an embodiment of this application. For example, a transmitter side is a terminal device, and a receiver side is a network device. The signal processing method 100 includes the following steps.

110. The terminal device determines a sequence $\{x_n\}$ including N elements, where N is equal to 18, $x_n$ is an element in the sequence $\{x_n\}$, and the sequence $\{x_n\}$ satisfies the following preset condition.

The preset condition is as follows: $x_n = y_{(n+M) mod N}$, where n traverses 0, 1, . . . N−1. For example, n may represent an index of each element in the sequence $\{x_n\}$. $M \in \{0,1, 2, \ldots, N-1\}$, and it should be understood that M may be an integer less than N. $y_n = A \cdot b_n \cdot j^{n mod 2}$, where A is a non-zero complex number, the element $b_n = u \cdot (1-2 \cdot s_n)$, u is a non-zero complex number, $j = \sqrt{-1}$, and a set of sequences $\{s_n\}$ including the element $s_n$ includes at least one sequence in a first sequence set.

Sequences in the first sequence set include:
{1, 0, 1, 1, 0, 1, 1, 1, 0, 0, 0, 0, 0, 1, 1, 1, 0, 0}, {1, 1, 0, 0, 0, 1, 0, 0, 0, 1, 1, 0, 0, 0, 1, 1, 1},
{0, 1, 1, 0, 0, 1, 0, 1, 0, 1, 0, 0, 1, 0, 0, 0, 1}, {1, 1, 1, 1, 1, 1, 0 0, 0, 0, 0, 0, 0, 1, 1, 0, 0, 0},
{1, 1, 1, 1, 0, 0, 0, 0, 0, 1, 1, 1, 0, 0, 1, 1, 1}, {1, 0, 0, 1, 0, 0, 0, 0, 0, 1, 0, 0, 0, 0, 1},
{1, 1, 1, 0, 0, 0, 0, 1, 0, 0, 0, 0, 0, 1, 0, 0, 1, 11, 1}, {1, 1, 1, 0, 0, 0, 0, 0, 1, 1, 0, 0, 0, 0, 0, 0, 1},
{1, 0, 0, 0, 0, 0, 0, 1, 1, 0, 1, 0, 0, 0}, {1, 1, 0, 0, 0, 0, 0, 0, 1, 1, 1, 0, 1, 0, 0, 1},
{1, 0, 0, 1, 1, 1, 1, 0, 1, 1, 0, 1, 1, 1, 0, 0, 0, 0}, {1, 1, 0, 0, 0, 1, 0, 1, 1, 0, 0, 0, 1, 0, 1, 1, 0, 1},
{1, 0, 1, 0, 0, 1, 0, 0, 1, 1, 1, 1, 1, 0, 0, 0, 0}, {1, 1, 1, 1, 0, 0, 0, 1, 1, 0, 1, 1, 0, 0, 0, 0, 0, 1},
{1, 0, 0, 1, 1, 1, 0, 0, 0, 0, 1, 1, 1, 1, 1, 0, 0}, {1, 0, 0, 1, 0, 0, 1, 1, 1, 1, 0, 0, 0, 0, 0},
{1, 1, 0, 1, 0, 1, 1, 0, 1, 0, 0, 0, 1, 1, 1, 0, 0, 1, 0}, {1, 0, 1, 0, 0, 1, 1, 1, 1, 1, 0, 0, 0, 0, 1, 0, 0}, and
{1, 0, 1, 1, 0,1, 1, 1, 1, 1, 0, 0, 0, 0, 0, 1, 1, 0}.

Optionally, step 110 may be performed as follows: After accessing a network, the terminal device determines the sequence $\{x_n\}$ including the N elements. Alternatively, when the terminal device accesses a network, the network device determines and configures a sequence $\{b_n\}$ for the terminal device, and the terminal device determines, based on the sequence $\{b_n\}$, the sequence $\{x_n\}$ including the N elements, where N is a positive integer greater than 1.

A value of u in $b_n = u \cdot (1-2 \cdot s_n)$ is not fixed. For example, values of u may be the same for all elements in a same currently selected sequence, and values of u may be different for elements in different sequences.

A value of M in $x_n = y_{(n+M) mod N}$ varies in different cases. When elements in a same sequence are determined, the value of M is constant and fixed. When another sequence is determined, the value of M may be 1 or another integer less than N.

Optionally, in an implementation, the set of the sequences $\{s_n\}$ is pre-stored in the terminal device and the network device. The network device determines a to-be-used sequence (denoted as a first sequence) in the set of the sequences $\{s_n\}$, and then configures the first sequence for the terminal device. After obtaining, based on the configuration of the network device, of the to-be-used first sequence, the terminal device may generate the sequence $\{x_n\}$ based on the foregoing preset condition.

For example, the network device may send, to the terminal device, a number of the first sequence, an identifier of the first sequence, a cell identity of the first sequence, or another piece of information that can identify the first sequence.

For another example, when the terminal device accesses the network, the network device configures the first sequence for the terminal device.

Optionally, in another implementation, the set of the sequences $\{s_n\}$ is pre-stored in the terminal device and the network device. The terminal device generates, based on the foregoing preset condition, a corresponding sequence $\{x_n\}$ for each sequence that is in the set of the sequences $\{s_n\}$. The network device also generates, based on the foregoing preset condition, the corresponding sequence $\{x_n\}$ for each sequence that is in the set of the sequences $\{s_n\}$. The network device selects a to-be-used sequence (denoted as a second sequence) from these generated sequences $\{x_n\}$, and then configures the second sequence to the terminal device. The terminal device learns of a to-be-used sequence $\{x_n\}$ based on the configuration of the network device, and may generate a first signal based on the sequence $\{x_n\}$.

For example, the network device may send, to the terminal device, a number of the second sequence, an identifier of the second sequence, a cell identity of the second sequence, or another piece of information that can identify the second sequence.

For another example, after the terminal device accesses the network, the network device configures the second sequence for the terminal device.

Optionally, a modulation scheme of the first signal is π/2 binary phase shift keying (BPSK).

For example, a waveform of the first signal may be DFT-s-OFDM,

120. The terminal device generates the first signal based on the sequence $\{x_n\}$.

130. Send the first signal to the network device. Correspondingly, the network device receives the first signal sent by the terminal device,

140. The network device obtains the sequence $\{x_n\}$, and processes the first signal based on the N elements that are in the sequence $\{x_n\}$.

Generally, a sequence with a relatively small PAPR also has a relatively small CM value. It is verified that CM values of sequences $\{s_n\}$ are all small; in other words, PAPRs of the sequences $\{s_n\}$ are relatively small.

A simulation result shows that sequences $\{x_n\}$ that correspond to the sequences described above and equivalent sequences of the sequences after π/2 BPSK. modulation is performed on the sequences and the equivalent sequences of the sequences may satisfy the following conditions.

Condition 1: Time-domain filtering is used. When a filtering coefficient is [0.1, 1, 0,1], a PAPR is less than 2.89 dB. When a filtering coefficient is [0.16, 1, 0.16], a PAPR is less than 2.35 dB. When a filtering coefficient is [0.22, 1, 0.22], a PAPR is less than 1.76 dB. When a filtering coefficient is [0.28, 1, 0.28], a PAPR is less than 1.27 dB.

Condition 2: For a frequency domain sequence corresponding to the sequences $\{x_n\}$, a maximum normalized power is less than 0.5 dB, and a minimum normalized power is greater than −0.5 dB. That is, frequency domain flatness of the sequences $\{x_n\}$ is relatively good.

For example, when a modulation scheme of the first signal is the π/2 BPSK, the first signal may also satisfy the foregoing condition 1 and condition 2.

It should be understood that, a relatively small PAPR of the sent first signal may help reduce energy consumption of a transmitter side (such as the terminal device), and relatively good frequency domain flatness of the sent first signal is advantageous to improving performance of performing channel estimation by using the first signal.

Therefore, in this embodiment of this application, the first signal is generated based on the sequence $\{x_n\}$. The sequence $\{x_n\}$ may satisfy a condition in which frequency domain flatness of a sequence is relatively good and a PAPR value is relatively small, so that when the first signal is a reference signal of a signal carried on a PUSCH, the relatively good frequency domain flatness of the sequence, and the relatively small PAPR value may be maintained for the sent first signal. Therefore, a requirement of a communication application environment in which the reference signal is sent can be met.

Optionally, the first signal is a reference signal.

For example, the first signal may be any one of the following: uplink control information (UCI), a DMRS, a sounding reference signal (SRS), a phase-tracking reference signal (PTRS), acknowledgment (ACK) information, negative acknowledgment (NACK) information, or uplink scheduling request (SR) information. This is not limited in this embodiment of this application.

Optionally, the first signal is a reference signal of a second signal, and a modulation scheme of the second signal is the π/2 binary phase shift keying BPSK.

Optionally, in some embodiments, the set of the sequences $\{s_n\}$ includes one or more of all the sequences that are in the first sequence set.

Optionally, in some embodiments, the set of the sequences $\{s_n\}$ includes one or more of some sequences that are in the first sequence set.

In an example, the set of the sequences $\{s_n\}$ includes one or more sequences that are in a second sequence set, and the second sequence set includes some sequences that are in the first sequence set.

For example, the second sequence set includes first 10 sequences of sequences included in the first sequence set described above.

Optionally, in addition to the foregoing sequences, the first sequence set may further include another feasible sequence with a length of 18.

For example, the first sequence set may further include a sequence: {1, 1, 0, 1, 1, 0, 1, 0, 1, 1, 0, 0, 0, 0, 0, 0, 0, 1}.

Figure 2:
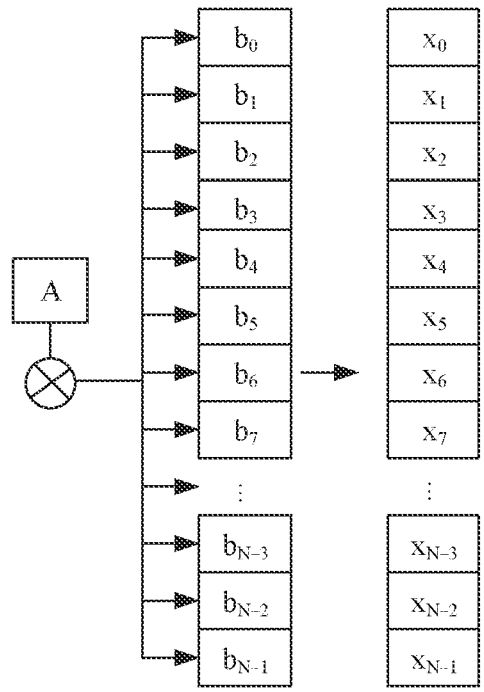
FIG. 2 is a schematic flowchart of determining a sequence $\{x_n\}$ by a terminal device according to an embodiment of this application.

In an example, FIG. 2 is a schematic diagram of determining a sequence $\{x_n\}$ by a terminal device. A procedure in which the terminal device determines the sequence $\{x_n\}$ includes the following steps.

Step 1: The terminal device determines the sequence $\{b_n\}$, where $b_n = u \cdot (1-2 \cdot s_n)$, $s_n$ is the element in the sequence $\{s_n\}$, u is the non-zero complex number, and n traverses 0, 1, ... N−1. For example, n may represent an index of each element in the sequence, and N is 18. The value of u is not fixed. For example, the values of u may be the same for all the elements in the same currently selected sequence, and the values of u may be different for the elements in the different sequences.

Optionally, in an implementation, the set of the sequences $\{s_n\}$ is pre-stored in the terminal device and the network device. The network device determines the to-be-used sequence (denoted as the first sequence) in the set of the sequences $\{s_n\}$, and then configures the first sequence for the terminal device, After obtaining, based on the configuration of the network device, of the to-be-used first sequence, the terminal device may generate the sequence $\{b_n\}$ according to $b_n = u \cdot (1-2 \cdot s_n)$.

For example, the network device may send, to the terminal device, the number of the first sequence, the identifier of the first sequence, the cell identity of the first sequence, or the another piece of information that can identify the first sequence.)

Optionally, in another implementation, the set of the sequences $\{s_n\}$ is pre-stored in the terminal device and the network device. The terminal device generates, according to $b_n = u \cdot (1-2 \cdot s_n)$, a corresponding sequence $\{b_n\}$ for each sequence that is in the set of the sequences $\{s_n\}$. The network device also generates, according to $b_n = u \cdot (1-2 \cdot s_n)$, the corresponding sequence $\{b_n\}$ for each sequence that is in the set of the sequences $\{s_n\}$. The network device selects a to-be-used sequence (denoted as a third sequence) from these generated sequences $\{b_n\}$, and then configures the third sequence to the terminal device. The terminal device learns of a to-be-used sequence $\{b_n\}$ based on the configuration of the network device.

For example, the network device may send, to the terminal device, a number of the third sequence, an identifier of the third sequence, a cell identity of the third sequence, or another piece of information that can identify the third sequence.

Step 2: The terminal device determines the sequence $\{x_n\}$ according to the following formula:

$$x_n = A \cdot b_n \cdot j^{n \bmod 2}, \text{ where}$$

A is the non-zero complex number, and $j = \sqrt{-1}$.

Therefore, in this embodiment of this application, the first signal is generated based on the sequence $\{x_n\}$. The sequence $\{x_n\}$ may satisfy the condition in which the frequency domain flatness of the sequence is relatively good and the PAPR value is relatively small, so that when the first signal is the reference signal of the signal carried on the PUSCH, the relatively good frequency domain flatness of the sequence, and the relatively small PAPR value may be maintained for the sent first signal. Therefore, the requirement of the communication application environment in which the reference signal is sent can be met.

The following describes a process of generating the first signal based on the sequence $\{x_n\}$ in step 120.

Optionally, in some embodiments, step 120 includes: performing discrete fourier transform (DFT) on the N elements that are in the sequence $\{x_n\}$, to obtain a sequence $\{f_n\}$ including N elements; and respectively mapping the N elements in the sequence $\{f_n\}$ to N subcarriers, to generate the first signal.

Optionally, before the performing discrete fourier transform on the N elements that are in the sequence $\{x_n\}$, the method further includes: filtering the sequence $\{x_n\}$.

Optionally, after the performing discrete fourier transform on the N elements that are in the sequence $\{x_n\}$, the method further includes: filtering the sequence $\{x_n\}$.

Optionally, the respectively mapping the N elements in the sequence $\{f_n\}$ to N subcarriers, to generate the first signal includes: respectively mapping the N elements in the sequence $\{f_n\}$ to the N subcarriers, to generate a frequency domain signal including N elements; performing inverse fast Fourier transform on the frequency domain signal, to obtain a time-domain signal; and adding a cyclic prefix to the time-domain signal, to generate the first signal.

Optionally, the respectively mapping the N elements in the sequence $\{f_n\}$ to N subcarriers, to generate the first signal includes: respectively mapping the N elements in the sequence $\{f_n\}$ to the N subcarriers, to generate a frequency domain signal including N elements; and using the frequency domain signal as the signal.

Figure 3:
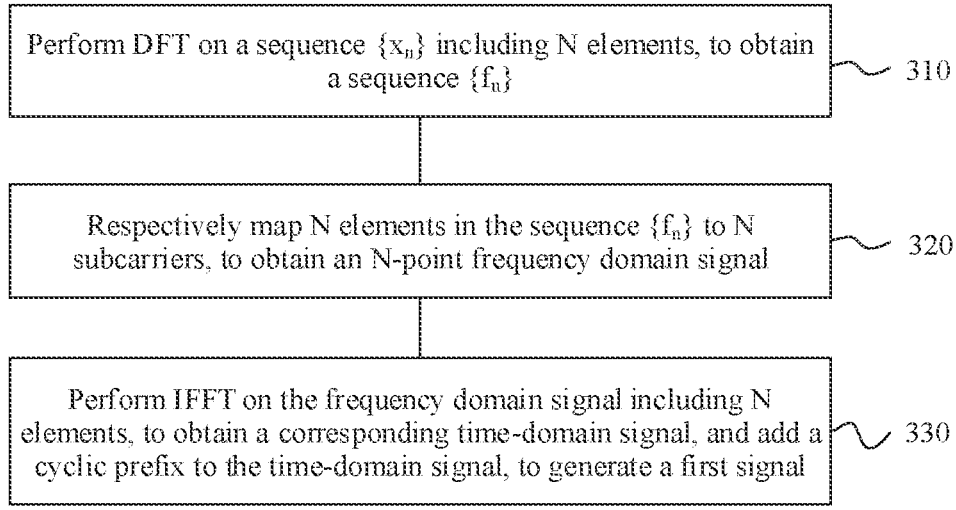
FIG. 3 is a schematic flowchart of generating a first signal by a terminal device according to an embodiment of this application.

In an example, FIG. 3 is a schematic flowchart of generating a sequence $\{x_n\}$. shown in FIG. 3, a procedure of generating the sequence $\{x_n\}$ includes the following steps.

310. The terminal device performs DFT on the sequence $\{x_n\}$ including the N elements, to obtain the sequence $\{f_n\}$.

Figure 4:
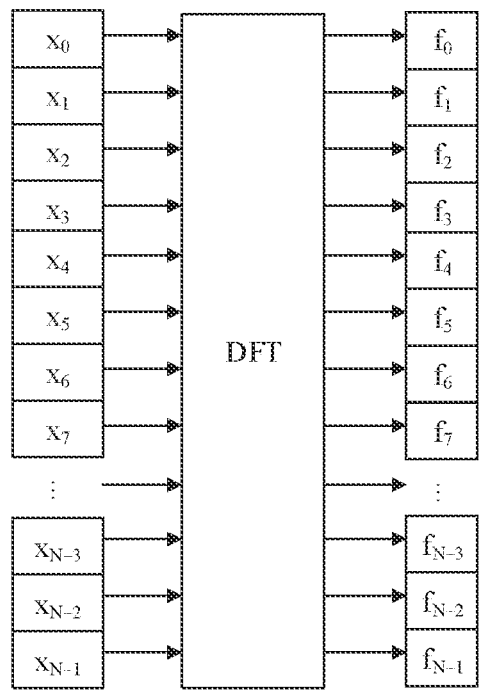
FIG. 4, FIG. 5.

Optionally, as shown in FIG. 4, in a process in which the terminal device performs the DFT on the sequence $\{x_n\}$ to obtain the sequence $\{f_n\}$, a filter may not be used.

Figure 5:
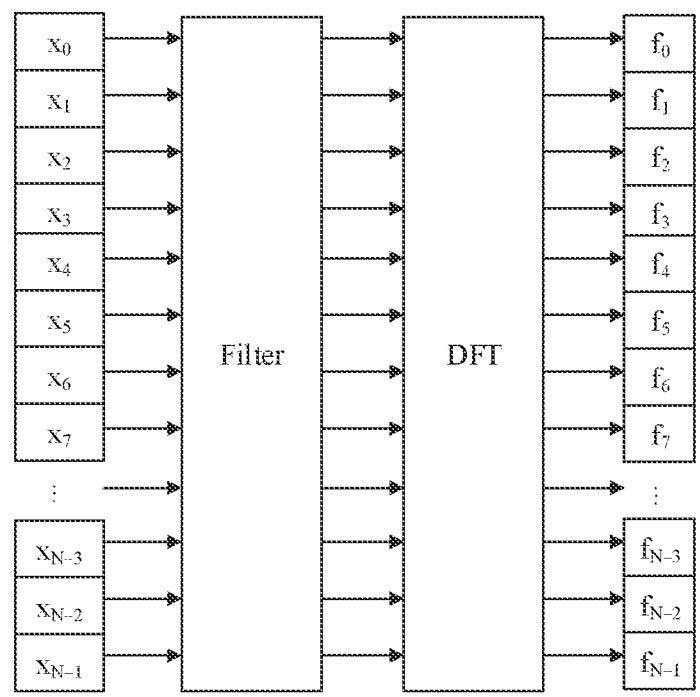

Optionally, as shown in FIG. 5, in a process in which the terminal device performs the DFT on the sequence $\{x_n\}$ to obtain the sequence $\{f_n\}$, the terminal device may first process the sequence $\{x_n\}$ by using a filter, and perform the DFT on a sequence $\{x_n\}$ obtained after the filtering processing, to obtain the sequence $\{f_n\}$.

Figure 6:
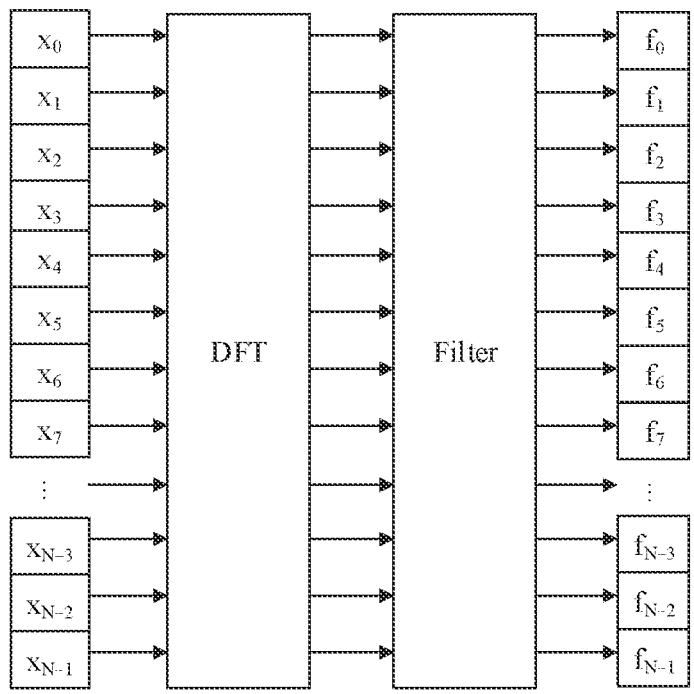
FIG. 6 are schematic diagrams of obtaining, by performing DFT on a sequence $\{x_n\}$ according to an embodiment of this application.

Optionally, as shown in FIG. 6, in a process in which the terminal device performs the DFT on the sequence $\{x_n\}$ to obtain the sequence $\{f_n\}$, the terminal device may first perform the DFT on the sequence $\{x_n\}$, and then perform processing by using a filter, to obtain the sequence $\{f_n\}$.

320. The terminal device respectively maps the N elements in the sequence $\{f_n\}$ to the N subcarriers, to obtain an N-point frequency domain signal.

The N-point frequency domain signal may be the frequency domain signal including the N elements.

Optionally, the terminal device respectively maps the N elements in the sequence $\{f_n\}$ to N consecutive subcarriers.

Figure 7:
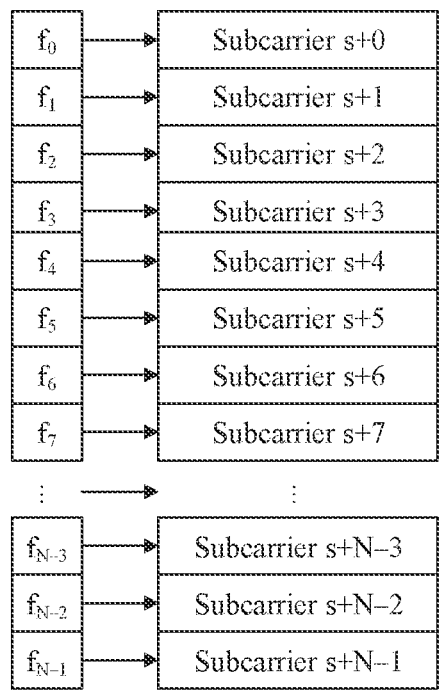
FIG. 7 and FIG. 8 are schematic diagrams of mapping a sequence {$f_n$} that includes N elements, that is in frequency domain, and that is obtained by performing DFT on a sequence {$x_n$} including N elements, to N subcarriers according to an embodiment of this application.

As shown in FIG. 7, elements, from $f_0$ to $f_{N-1}$, in the sequence $\{f_n\}$ are mapped, respectively, to the N consecutive subcarriers whose numbers are s+0, s+1, ... s+N−1.

Figure 8:
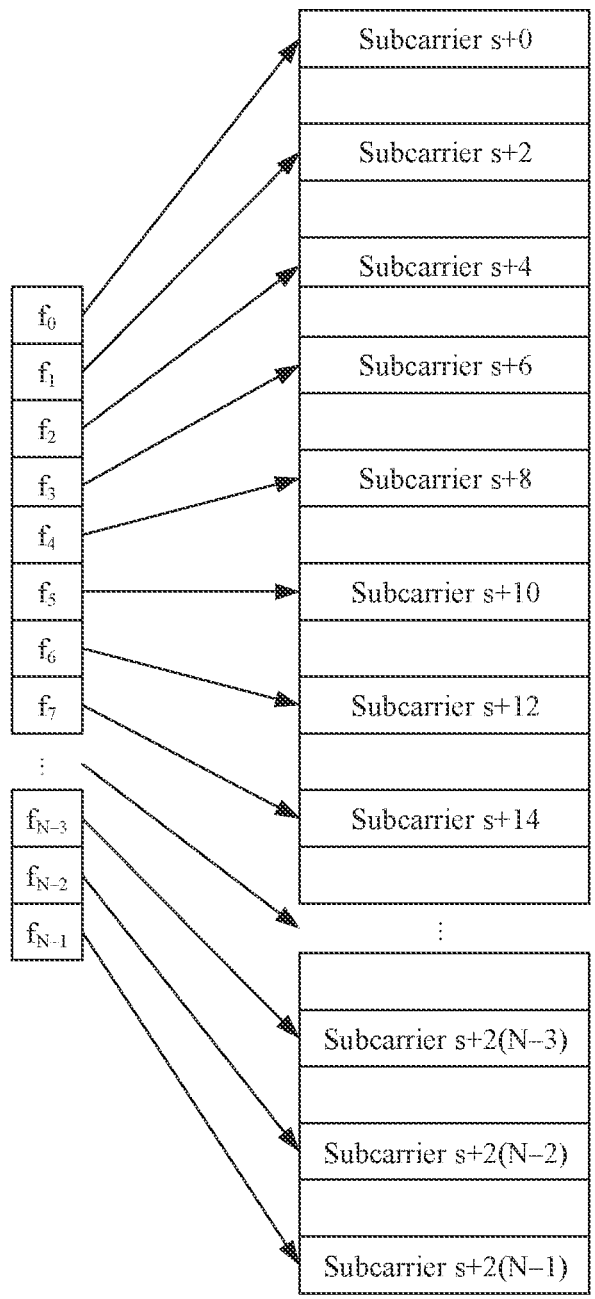

In FIG. 7 and FIG. 8 that is to be mentioned below; s represents an index, in subcarriers in a communications system, of the first subcarrier of the N subcarriers to which the sequence $\{f_n\}$ is mapped.

In a possible example, the terminal device sequentially maps the N elements in the sequence $\{f_n\}$ to the N subcarriers in descending order of the subcarriers.

One element in the sequence $\{f_n\}$ is mapped to one frequency domain subcarrier. The frequency domain subcarrier is a minimum unit of a frequency domain resource, and is used to carry data information.

In a possible example, the terminal device sequentially maps the N elements in the sequence $\{f_n\}$ to the N subcarriers in ascending order of the subcarriers.

Mapping one element in the sequence $\{f_n\}$ to one subcarrier means that the element is carried on the subcarrier. After the mapping, the terminal device sends data by using a radio frequency, and this is equivalent to that the terminal device sends the element on the subcarrier.

In the communications system, different terminal devices may occupy different subcarriers to send the data. Locations of the N subcarriers in a plurality of subcarriers in the communications system may be predefined or may be configured by the network device by using signaling.

Optionally, the terminal device may respectively map the N elements in the sequence $\{f_n\}$ to N evenly spaced subcarriers.

For example, an interval between the N subcarriers is 1, and the N subcarriers are evenly distributed in frequency domain. As shown in FIG. 8, elements, from $f_0$ to $f_{N-1}$, in the sequence $\{f_n\}$ are mapped, respectively, to the N evenly spaced subcarriers whose numbers are s+0, s+2, ... s+2(N−1).

In this embodiment of this application, a manner of respectively mapping the N elements in the sequence $\{f_n\}$ to the N subcarriers is not limited to the foregoing manners.

330. The terminal device performs the inverse fast fourier transform (IFFT) on the frequency domain signal including the N elements, to obtain the corresponding time-domain signal, and adds the cyclic prefix to the time-domain signal, to generate the first signal.

For example, the time-domain signal obtained after the terminal device performs the IFFT on the frequency domain signal including the N elements is an orthogonal frequency division multiplexing (OFDM) symbol.

If the first signal is generated in the manner shown in FIG. 3, in step 130 in the foregoing embodiment, the terminal device sends the first signal by using the radio frequency, The terminal device sends the first signal by using the radio frequency. To be specific, the terminal device sends, on the N subcarriers, the first signal that carries the sequence $\{f_n\}$.

In a possible example, the terminal device may send, on one OFDM symbol, the first signal that carries the sequence $\{f_n\}$, or may send, on a plurality of OFDM symbols, the first signal carrying the sequence $\{f_n\}$.

Optionally, in some embodiments, step 120 includes: processing, using a molding filter, the N elements that are in the sequence $\{x_n\}$, to obtain the sequence $\{f_n\}$ including the N elements; and respectively mapping the N elements in the sequence $\{f_n\}$ to the N subcarriers, to generate the first signal.

Optionally, the N subcarriers are the N consecutive subcarriers or the N evenly spaced subcarriers.

As described above, the first signal this application may be the reference signal, but this application is not limited thereto.

Optionally, in some embodiments, the first signal is a signal used to carry communication information.

The communication information may be carried in a sequence selection manner, or may be carried in a sequence modulation manner. This is not limited in this application.

Optionally, the communication information is carried in the sequence selection manner.

In an example, $2^n$ orthogonal sequences are allocated to one terminal device. The $2^n$ orthogonal sequences may be $2^n$ cyclic shifts of one root sequence, and the $2^n$ orthogonal sequences can carry n-bit information. For example, it is assumed that there are four sequences numbered 0, 1, 2, and 3, where 00 corresponds to the sequence 0, 01 corresponds to the sequence 1, 10 corresponds to the sequence 2, and 11 corresponds to the sequence 3. In this way, the four sequences can carry 2-bit information.

Optionally, the communication information is carried in the sequence modulation manner.

In an example, one sequence is allocated to one user, and a modulation symbol is generated based on information that is of the user and that needs to be transmitted. The modulation symbol includes but is not limited to a BPSK symbol, a QPSK symbol, an 8QAM symbol, a 16QAM symbol, and the like. The modulation symbol is multiplied by the sequence, to generate an actual sent sequence. It is assumed that one BPSK symbol is 1 or −1. After one sequence $\{x_n\}$ is modulated based on the BPSK symbol, the sent sequence may be a sequence $\{x_n\}$ or $\{-x_n\}$.

In a possible example, in the foregoing description with reference to FIG. 2, after accessing the network, the terminal device may determine, based on A and the sequence $\{b_n\}$, the sequence $\{x_n\}$ that includes the N elements and that is configured by the network device.

For example, if the first signal is the signal used to carry the communication information, and the communication information is carried in the sequence modulation manner, the first signal carries different information based on different values of A in the sequence $\{x_n\}$.

Optionally, A may be a modulation symbol. In this case, A is obtained after a data information bit or a control information bit is modulated. A is carried on the N elements included in the sequence $\{x_n\}$, and A does not change with n.

Optionally, A is a constant. For example, A=1. For example, A may be a symbol known to both the terminal device and the network device. Alternatively, A may indicate an amplitude.

It should be noted that, that A is a constant in a transmission time unit does not mean that A is fixed, and A may change when the first signal is sent at different moments. For example, all the N elements included in the sequence $\{x_n\}$ are reference signals, and A is an amplitude of the reference signals. The terminal device may send the first signal based on A=1 for the first time. The terminal device may send the first signal based on A=2 for the second time.

The following describes a process of processing the first signal after the receiver side, namely, the network device receives the first signal.

In step 130, the network device receives the first signal sent by the terminal device.

For example, the network device receives, based on locations that are predefined or configured by a base station and that are of the N subcarriers in the subcarriers of the communications system, the first signal that is on the N subcarriers.

Optionally, the network device obtains the first signal on the N consecutive subcarriers or the N evenly spaced subcarriers, In step 140, the network device obtains the sequence $\{x_n\}$, and processes the first signal based on the N elements that are in the sequence $\{x_n\}$.

Optionally, in an implementation, a process in which the network device obtains the N elements that are in the sequence $\{x_n\}$ includes: receiving, by the network device, the first signal on the N subcarriers; removing the cyclic prefix of the first signal, to obtain the time-domain signal; performing M-point DFT on the time-domain signal, to obtain the frequency domain signal including the N elements; where M is greater than or equal to N; determining, based on the frequency domain signal including the N elements, the N elements that are in the sequence $\{f_n\}$; and performing inverse discrete fourier transform (IDFT) on the sequence $\{f_n\}$, to obtain the N elements that are in the sequence $\{x_n\}$.

Optionally, in another implementation, the network device and the terminal device already know a used sequence $\{s_n\}$, and a process in which the network device obtains the N elements that are in the sequence $\{x_n\}$ includes: obtaining, by the network device, the sequence $\{x_n\}$ according to the following formula, to further obtain the N elements that are in the sequence $\{x_n\}$:

$b_n = u \cdot (1 - 2 \cdot s_n),$ $y_n = A \cdot b_n \cdot j^{n \bmod 2},$ and $x_n = y_{(n+M) \bmod N},$ where $s_n$ is the element in the sequence $\{s_n\}$, N is the non-zero complex number, n traverses 0, 1, 2, ... N−1, N is equal to 18, A is the non-zero complex number, $j=\sqrt{-1}$, $M \in \{0,1, 2, \ldots, N-1\}$, and the set of the sequences $\{s_n\}$ includes at least one sequence in the foregoing first sequence set.

Optionally, in still another implementation, the network device and the terminal device already know a used sequence $\{b_n\}$, where $b_n = u \cdot (1 - 2 \cdot s_n)$, and a process in which the network device obtains the N elements that are in the sequence $\{x_n\}$ includes: obtaining, by the network device, the sequence $\{x_n\}$ according to the following formula, to further obtain the N elements that are in the sequence $\{x_n\}$:

$y_n = A \cdot b_n \cdot j^{n \bmod 2},$ and $x_n = y_{(n+M) \bmod N},$ where $b_n$ is the element in the sequence $\{b_n\}$ n traverses 0, 1, 2, ... N−1, N is equal to 18, A is the non-zero complex number, $j=\sqrt{-1}$, $M \in \{0,1,2, \ldots, N-1\}$, and the set of the sequences $\{s_n\}$ includes at least one sequence in the foregoing first sequence set.

Optionally, in still another implementation, if the network device and the terminal device already know a used sequence $\{x_n\}$, in step 140, the network device may directly process the first signal by using N elements that are in the sequence $\{x_n\}$.

Optionally, the first signal is the reference signal of the second signal. For example, the second signal is carried on a shared channel.

The network device may obtain, by processing the first signal based on the sequence $\{x_n\}$, a channel matrix H of the shared channel on which the second signal is carried. Optionally, the method further includes: demodulating the second signal based on the channel matrix.

Figure 9:
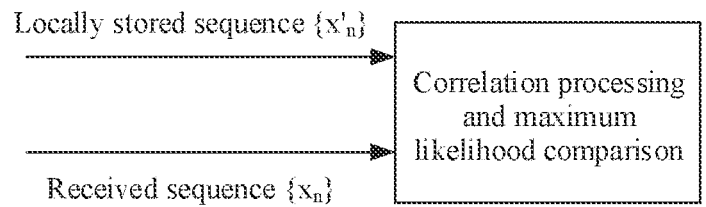
FIG. 9 is a schematic diagram of processing a first signal by a network device according to an embodiment of this application.

For example, a process in which the network device processes the first signal is shown in FIG. 9. The network device obtains all possible sequences by traversing a locally stored sequence $\{x_n'\}$. The network device separately performs related processing on the obtained sequence $\{x_n\}$, and all the possible sequences of the sequence $\{x_n'\}$, and performs maximum likelihood comparison, to obtain the data transmitted by the terminal device.

It is assumed that a value combination of 2-bit information is $\{(0, 0), (0, 1), (1, 0), (1,1)\}$. When the 2-bit information is $(0, 0)$, an obtained sequence of $\{x_n'\}$ is a sequence $\{x_{1,n}'\}$. When the 2-bit information is $(0, 1)$, an obtained sequence of $\{x_n'\}$ is a sequence $\{x_{2,n}'\}$. When the 2-bit information is (1, 0), an obtained sequence of $\{x_n'\}$ is a sequence $\{x_{3,n}'\}$. When the 2-bit information is (1, 1), an obtained sequence of $\{x_n'\}$ is a sequence $\{x_{4,n}'\}$. The four sequences: $\{x_{1,n}'\}$, $\{x_{2,n}'\}$, $\{x_{3,n}'\}$, and $\{x_{4,n}'\}$ may be cyclic shift sequences of a same sequence: The sequence $\{x_n\}$ is separately correlated with $\{x_{1,n}'\}$, $\{x_{2,n}'\}$, $\{x_{3,n}'\}$, and and $\{x_{4,n}'\}$, to obtain four correlation values. A value of 2-bit information corresponding to the largest correlation value is the data obtained by the network device. For example, if the largest correlation value is obtained by correlating the sequence with $\{x_n\}$ with $\{x_{1,n}'\}$, the 2-bit information is (0, 0); to be specific, the data obtained by the network device is the bit information (0, 0).

Therefore, in this embodiment of this application, the first signal is generated based on the sequence $\{x_n\}$. The sequence $\{x_n\}$ may satisfy the condition in which the frequency domain flatness of the sequence is relatively good and the PAPR value is relatively small, so that when the first signal is the reference signal of the signal carried on the PUSCH, the relatively good frequency domain flatness of the sequence, and the relatively small PAPR value may be maintained for the sent first signal. Therefore, the requirement of the communication application environment, especially an NR system or an NR similar scenario, in which the reference signal is sent can be met.

Therefore, in this embodiment of this application, the first signal is generated based on the sequence $\{x_n\}$. The sequence $\{x_n\}$ may satisfy the condition in which the frequency domain flatness of the sequence is relatively good and the PAPR value is relatively small, so that when the first signal is the reference signal of the signal carried on the PUSCH, the relatively good frequency domain flatness of the sequence, and the relatively small PAPR value may be maintained for the sent first signal. Therefore, the requirement of the communication application environment in which the reference signal is sent can be met.

Figure 10:
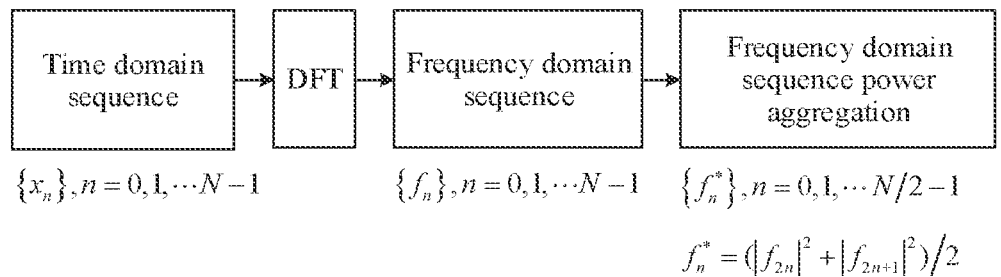
FIG. 10 and FIG. 11 are schematic flowcharts of an embodiment of this application.
Figure 11:
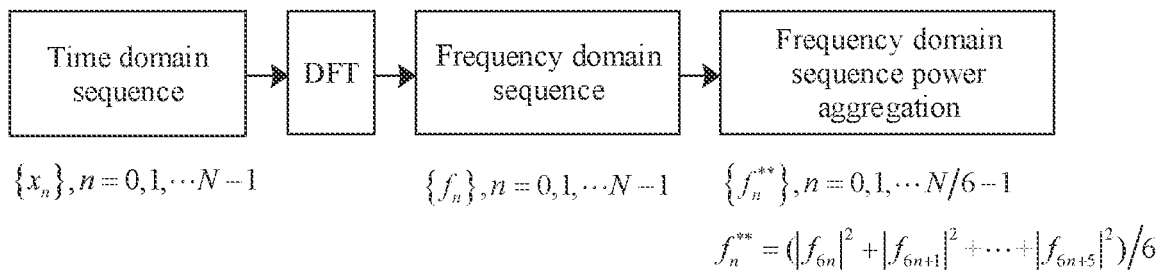

In an example, whether a time domain sequence is flat in frequency domain may be determined according to a procedure shown in FIG. 10 or FIG. 11.

As shown in FIG. 10, a first-type maximum normalized power of a frequency domain sequence corresponding to one time domain sequence $\{x_n\}$ is defined as a maximum value that exists after a sequence $\{f_n^*\}$ is normalized, and a first-type minimum normalized power of the frequency domain sequence corresponding to the time domain sequence $\{x_n\}$ is defined as a minimum value that exists after the sequence $\{f_n^*\}$ is normalized.

As shown in FIG. 11, a second-type maximum normalized power of a frequency domain sequence corresponding to one time domain sequence $\{x_n\}$ is defined as a maximum value that exists after a sequence $\{f_n^{}\}$ is normalized, and a second-type minimum normalized power of the frequency domain sequence corresponding to the time domain sequence $\{x_n\}$ is defined as a minimum value that exists after the sequence $\{f_n^{}\}$ is normalized.

It can be learned from the foregoing description that, in this embodiment of this application, the first signal is generated based on the sequence $\{x_n\}$. The sequence $\{x_n\}$ may satisfy the condition in which the frequency domain flatness of the sequence is relatively good and the PAPR value is relatively small, so that when the first signal is the reference signal of the signal carried on the PUSCH, the relatively good frequency domain flatness of the sequence, and the relatively small PAPR value may be maintained for the sent first signal. Therefore, the requirement of the communication application environment in which the reference signal is sent can be met.

The embodiments described in this specification may be independent solutions, or may be combined based on internal logic. All these solutions fall within the protection scope of this application.

The foregoing describes the method embodiments of this application, and the following describes apparatus embodiments corresponding to the foregoing method embodiments. It should be understood that descriptions of the apparatus embodiments correspond to the descriptions of the method embodiments. Therefore, for content that is not described in detail, refer to the foregoing method embodiments. For brevity, details are not described herein again.

Figure 12:
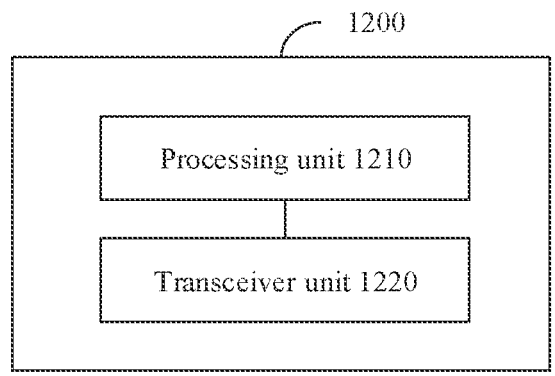
FIG. 12 is a schematic structural diagram of a signal processing apparatus according to an embodiment of this application.

As shown in FIG. 12, an embodiment of this application provides a sequence-based signal processing apparatus 1200. The signal processing apparatus 1200 may be a communications device, or may be a chip in a communications device. For example, the signal processing apparatus 1200 corresponds to the terminal device in the foregoing method embodiments. The signal processing apparatus 1200 includes the following units.

A processing unit 1210 is configured to determine a sequence $\{x_n\}$ including N elements, where N is equal to 18, $x_n$ is an element in the sequence $\{x_n\}$, the sequence $\{x_n\}$ satisfies a preset condition, the preset condition is as follows: $x_n = y_{(n+M) \bmod N}$, a value of n ranges from 0 to N−1, M∈{0, 1, 2, ..., N−1}, and $y_n = A \cdot b_n \cdot j^{n \bmod 2}$, where A is a non-zero complex number, the element $b_n = u \cdot (1-2 \cdot s_n)$, u is a non-zero complex number, $j = \sqrt{-1}$, and a set of sequences $\{s_n\}$ including the element $s_n$ includes at least one sequence in a first sequence set.

Sequences in the first sequence set include:

{1, 0, 1, 1, 0, 1, 1, 1, 0, 0, 0, 0, 1, 1, 1, 0, 0}, {1, 1, 0, 0, 0, 1, 0, 0, 1, 0, 1, 1, 0, 0, 0, 1, 1, 1},

{1, 0, 1, 1, 0, 0, 1, 0, 1, 0, 1, 0, 0, 1, 0, 0, 0, 1}, {1, 1, 1, 1, 1, 1, 0, 0, 0, 0, 0, 0, 0, 1, 1, 0, 0, 0},

{1, 1, 1, 1, 0, 0, 0, 0, 0, 1, 1, 1, 0, 0, 1, 1, 1}, {1, 1, 1, 1, 0, 0, 1, 0, 0, 0, 0, 0, 1, 0, 0, 0, 0, 1},

{1, 1, 1, 0, 0, 0, 1, 0, 0, 0, 0, 0, 1, 0, 0, 1, 1}, {1, 1, 1, 1, 0, 0, 0, 0, 0, 1, 1, 0, 0, 0, 0, 1, 1},

{1, 1, 1, 1, 1, 0, 0, 0, 0, 0, 1, 1, 0, 1, 0, 0, 0}, {1, 1, 1, 1, 1, 0, 0, 0, 0, 0, 1, 1, 0, 1, 0, 0, 1},

{1, 0, 0, 1, 1, 1, 1, 0, 1, 1, 0, 1, 1, 1, 0, 0, 0, 0}, {1, 1, 0, 0, 0, 1, 0, 1, 1, 0, 0, 0, 1, 0, 1, 1, 0, 1},

{1, 0, 0, 0, 1, 0, 1, 0, 1, 0, 0, 1, 1, 1, 1, 0, 0, 0}, {1, 1, 1, 1, 0, 0, 0, 1, 1, 0, 1, 1, 0, 0, 0, 0, 1},

{1, 0, 0, 0, 1, 1, 1, 0, 0, 0, 0, 1, 1, 1, 1, 1, 0, 0}, {1, 1, 1, 1, 0, 0, 1, 0, 0, 1, 1, 1, 1, 0, 0, 0, 0},

{1, 1, 0, 1, 0, 1, 1, 0, 1, 0, 0, 1, 1, 1, 0, 0, 1, 0}, {1, 0, 1, 0, 0, 1, 1, 1, 1, 1, 0, 0, 0, 0, 0, 1, 0, 0, 0}, and

{1, 0, 1, 1, 0, 1, 1, 1, 1, 1, 0, 0, 0, 0, 0, 1, 1, 0}.

The processing unit 1210 is further configured to generate a first signal based on the sequence $\{x_n\}$.

A transceiver unit 1220 is configured to send the first signal.

Therefore, in this embodiment of this application, the first signal is generated based on the sequence $\{x_n\}$. The sequence $\{x_n\}$ may satisfy a condition in which frequency domain flatness of a sequence is relatively good and a PAPR value is relatively small, so that when the first signal is a reference signal of a signal carried on a PUSCH, the relatively good frequency domain flatness of the sequence, and the relatively small PAPR value may be maintained for the sent first signal. Therefore, a requirement of a communication application environment in which the reference signal is sent can be met.

Optionally, in some embodiments, the se of the sequences $\{s_n\}$ includes at least one sequence in a second sequence set, and the second sequence se includes some or all of the sequences that are in the first sequence set.

Optionally, in some embodiments, the processing unit 1210 is configured to: perform discrete fowler transform on the N elements that are in the sequence $\{x_n\}$, to obtain a sequence $\{f_n\}$ including N elements; respectively map the N elements in the sequence $\{f_n\}$ to N subcarriers, to obtain a frequency domain signal including N elements; and generate the first signal based on the frequency domain signal.

Optionally, in some embodiments, the N subcarriers are N consecutive subcarriers or N evenly spaced subcarriers.

Optionally, in some embodiments, the processing unit 1210 is configured to: before performing discrete fourier transform on the N elements that are in the sequence $\{x_n\}$, filter the sequence $\{x_n\}$. Alternatively, the processing unit 1210 is configured to: after performing discrete fourier transform on the N elements that are in the sequence $\{x_n\}$, filter the sequence $\{x_n\}$.

Optionally, in some embodiments, the first signal is a reference signal of a second signal, and a modulation scheme of the second signal is ρ/2 binary phase shift keying BPSK.

It should be understood that the processing unit 1210 may be implemented by using a processor or a processor-related circuit. The transceiver unit 1220 may be implemented by using a transceiver or a transceiver-related circuit.

Figure 13:
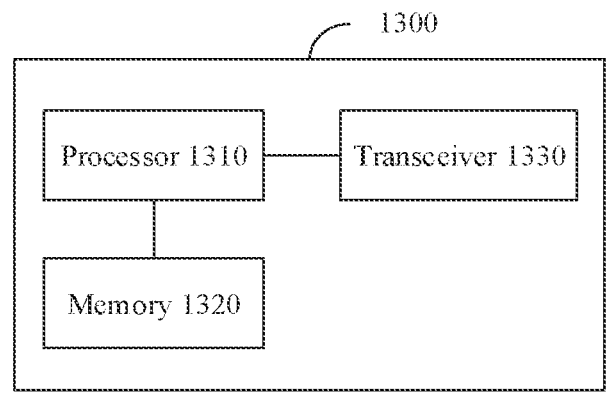
FIG. 13 is another schematic structural diagram of a signal processing apparatus according to an embodiment of this application.

As shown in FIG. 13, an embodiment of this application further provides a signal processing apparatus 1300. The signal processing apparatus 1300 includes a processor 1310, a memory 1320, and a transceiver 1330. The memory 1320 stores an instruction or a program, and the processor 1310 is configured to execute the instruction or the program stored in the memory 1320. When the instruction or the program stored in the memory 1320 is executed, the processor 1310 is configured to perform an operation performed by the processing unit 1210 in the foregoing embodiment, and the transceiver 1330 is configured to perform an operation performed by the transceiver module 1220 in the foregoing embodiment.

It should be understood that the signal processing apparatus 1200 or the signal processing apparatus 1300 provided in the embodiments of this application may correspond to the terminal device in the foregoing method embodiments, and operations and/or functions of modules in the signal processing apparatus 1200 or the signal processing apparatus 1300 are used to implement corresponding procedures of the method described above. For brevity, details are not described herein again.

An embodiment of this application further provides a sequence-based signal processing apparatus. The signal processing apparatus may be a terminal device, or may be an integrated circuit or a chip. The signal processing apparatus may be configured to perform an action performed by the terminal device in the foregoing method embodiments.

Figure 14:
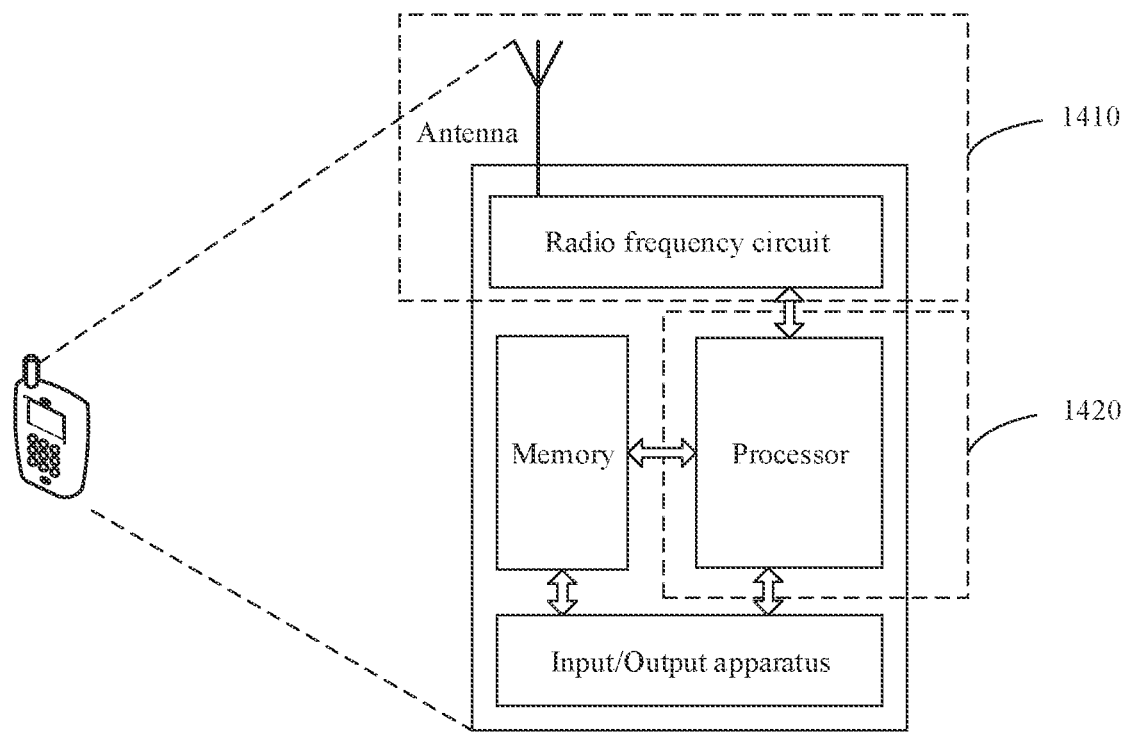
FIG. 14 is a schematic structural diagram of a terminal device according to an embodiment of this application.

When the signal processing apparatus is the terminal device, FIG. 14 is a simplified schematic structural diagram of a terminal device. For ease of understanding and illustration, an example in which the terminal device is a mobile phone is used in FIG. 14. As shown in FIG. 14, the terminal device includes a processor, a memory, a radio frequency circuit, an antenna, and an input/output apparatus. The processor is mainly configured to: process a communications protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus such as a touchscreen, a display, or a keyboard is mainly configured to receive data entered by a user and output data to the user. It should be noted that some types of terminal devices may not have the input/output apparatus.

When data needs to be sent, after performing baseband processing on the to-be-sent data, the processor outputs a baseband signal to the radio frequency circuit, and the radio frequency circuit performs radio frequency processing on the baseband signal and then sends a radio frequency signal to the outside in the form of the electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 14 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor that has a processing function may be considered as a processing unit of the terminal device. As shown in FIG. 14, the terminal device includes a transceiver unit 1410 and a processing unit 1420. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1410 and that is configured to implement the receiving function may be considered as a receiving unit, and a component that is in the transceiver unit 1410 and that is configured to implement the sending function may be considered as a sending unit. That is, the transceiver unit 1410 includes the receiving unit and the sending unit. The transceiver unit sometimes may also be referred to as the transceiver machine, the transceiver, the transceiver circuit, or the like. The receiving unit sometimes may also be referred to as a receiving machine, a receiver, a receiving circuit, or the like. The sending unit sometimes may also be referred to as a sending machine, a transmitter, a sending circuit, or the like.

It should be understood that the transceiver unit 1410 is configured to perform a sending operation and a receiving operation that are on a terminal device side and that are in the foregoing method embodiments, and the processing unit 1420 is configured to perform another operation, other than the sending operation and the receiving operation, that is on the terminal device side and that is in the foregoing method embodiments.

For example, in an implementation, the processing unit 1420 is configured to perform step 110 and step 120 in FIG. 1, and/or the processing unit 1420 is further configured to perform another processing step that is on the terminal device side and that is in the embodiments of this application. The transceiver unit 1410 is further configured to perform a sending action that is on the terminal device side and that is in step 120 in FIG. 1, and/or the transceiver unit 1410 is further configured to perform other sending and receiving steps that are on the terminal device side and that are in the embodiments of this application.

For example, in another implementation, the processing unit 1420 is configured to perform step 310 to step 330 in FIG. 3, and/or the processing unit 1420 is further configured to perform another processing step that is on the terminal device side and that is in the embodiments of this application. The transceiver unit 1410 is further configured to perform other sending and receiving steps that are on the terminal device side and that are in the embodiments of this application.

When the communications apparatus is the chip, the chip includes a transceiver unit and a processing unit. The transceiver unit may be an input/output circuit or a communications interface. The processing unit is a processor, a microprocessor, or an integrated circuit integrated on the chip.

Figure 15:
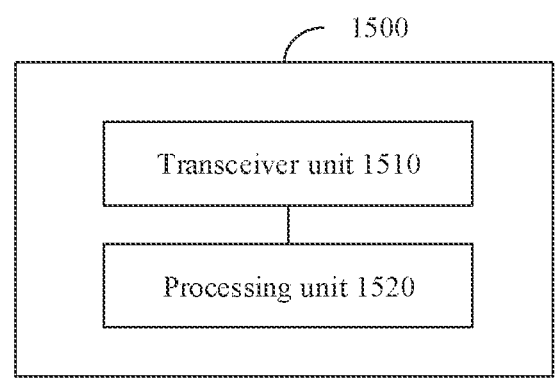
FIG. 15 is a schematic structural diagram of another signal processing apparatus according to an embodiment of this application.

As shown in FIG. 15, an embodiment of this application provides a sequence-based signal processing apparatus 1500. The signal processing apparatus 1500 may be a communications device, or may be a chip in a communications device. For example, the signal processing apparatus 1500 corresponds to the network device in the foregoing method embodiments. The signal processing. apparatus 1500 includes the following units.

A transceiver unit 1510 is configured to receive a first signal.

A processing unit 1520 is configured to: obtain N elements in a sequence $\{x_n\}$, where N is equal to 18, $x_n$ is an element in the sequence $\{x_n\}$, the sequence $\{x_n\}$ satisfies a preset $M \in \{0, 1, 2, \ldots, N-1\}$, and $y_n = A \cdot b_n \cdot j^{nmod2}$, where A is a non zero complex number, the element $b_n = u \cdot (1-2 \cdot s_n)$, u is a non-zero complex number, $j = \sqrt{-1}$, and a set of sequences $\{s_n\}$ including the element $s_n$ includes at least one sequence in a first sequence set; and process the first signal based on the N elements that are in the sequence $\{x_n\}$.

Sequences in the first sequence set include:

{1, 0, 1, 1, 0, 1, 1, 1, 0, 0, 0, 0, 0, 1, 1, 1, 0, 0}, {1, 1, 0, 0, 0, 1, 0, 0, 1, 0, 1, 1, 0, 0, 0, 1, 1, 1},

{1, 0, 1, 1, 0, 0, 1, 0, 1, 0, 1, 0, 0, 1, 0, 0, 0, 1}, {1, 1, 1, 1, 1, 1, 0, 0, 0, 0, 0, 0, 0, 1, 1, 0, 0, 0},

{1, 1, 1, 1, 0, 0, 0, 0, 0, 0, 1, 1, 1, 0, 0, 1, 1, 1}, {1, 1, 1, 1, 0, 0, 1, 0, 0, 0, 0, 1, 0, 0, 0, 1},

{1, 1, 1, 0, 0, 0, 0, 1, 0, 0, 0, 0, 0, 1, 0, 0, 1, 1}, {1, 1, 1, 1, 0, 0, 0, 0, 0, 1, 1, 0, 0, 0, 0, 1, 1},

{1, 1, 1, 1, 1, 0, 0, 0, 0, 0, 1, 1, 0, 1, 0, 0, 0}, {1, 1, 1, 1, 0, 0, 0, 0, 0, 1, 1, 1, 1, 0, 1, 0, 0, 1},

{1, 0, 0, 1, 1, 1, 1, 0, 1, 1, 0, 0, 1, 1, 1, 0, 0, 0, 0}, {1, 1, 1, 0, 0, 0, 1, 0, 1, 1, 0, 0, 0, 1, 0, 1, 1, 0, 1},

{1, 0, 0, 1, 0, 1, 0, 1, 0, 0, 1, 1, 1, 1, 1, 0, 0, 0}, {1, 1, 1, 1, 0, 0, 0, 1, 1, 0, 1, 1, 0, 0, 0, 0, 0, 1},

{1, 0, 0, 1, 1, 1, 0, 0, 0, 0, 0, 1, 1, 1, 1, 1, 0, 0}, {1, 1, 1, 1, 0, 0, 1, 0, 0, 1, 1, 1, 1, 0, 0, 0, 0, 0},

{1, 1, 0, 1, 0, 1, 1, 0, 1, 0, 0, 1, 1, 1, 0, 0, 1, 0, 1}, {1, 0, 1, 0, 0, 1, 1, 1, 1, 1, 0, 0, 0, 0, 0, 1, 0, 0}, and

{1, 0, 1, 1, 0, 1, 1, 1, 1, 0, 0, 0, 0, 0, 1, 1, 0}.

Therefore, in this embodiment of this application, the first signal is generated based on the sequence $\{x_n\}$. The sequence $\{x_n\}$ may satisfy a condition in which frequency domain flatness of a sequence is relatively good and a PAPR value is relatively small, so that when the first signal is a reference signal of a signal carried on a PUSCH, the relatively good frequency domain flatness of the sequence, and the relatively small PAPR value may be maintained for the sent first signal. Therefore, a requirement of a communication application environment in Which the reference signal is sent can be met.

Optionally, in some embodiments, the set of the sequences $\{s_n\}$ includes at least one sequence in a second sequence set, and the second sequence set includes some or all of the sequences that are in the first sequence set.

Optionally, in some embodiments, the transceiver unit 1510 is further configured to: obtain the first signal on N consecutive subcarriers, or obtain the first signal on N evenly spaced subcarriers.

The processing unit 1520 is further configured to: obtain N elements in a sequence $\{f_n\}$, where N is a positive integer greater than 1, the first signal is generated by mapping the sequence $\{f_n\}$ to the N subcarriers, and $f_n$ is an element in the sequence $\{f_n\}$, (and perform inverse discrete fourier transform on the sequence $\{f_n\}$, to obtain the N elements that are in the sequence $\{x_n\}$.

Optionally, in some embodiments, the first signal is a reference signal of a second signal, and a modulation scheme of the second signal is ρ/2 binary phase shift keying BPSK.

It should be understood that the transceiver unit 1510 may be implemented by using a transceiver or a transceiver-related circuit. The processing unit 1520 may be implemented by using a processor or a processor-related circuit.

Figure 16:
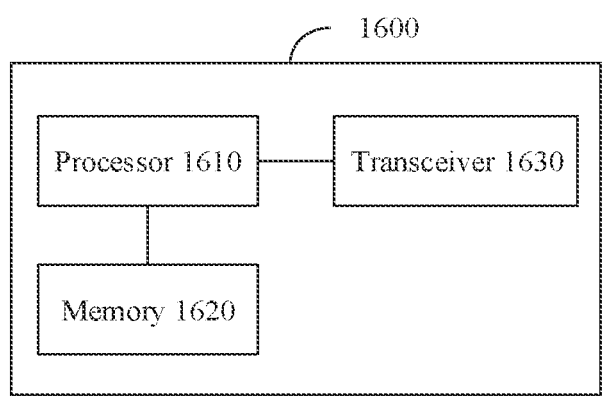
FIG. 16 is another schematic structural diagram of another signal processing apparatus according to an embodiment of this application.

As shown in FIG. 16, an embodiment of this application further provides a sequence--based signal processing apparatus 1600. The signal processing apparatus 1600 includes a processor 1610, a memory 1620, and a transceiver 1630. The memory 1620 stores an instruction or a program, and the processor 1610 is configured to execute the instruction or program stored in the memory 1620. When the instruction or the program stored in the memory 1620 is executed, the processor 1610 is configured to perform an operation performed by the processing unit 1520 in the foregoing embodiment, and the transceiver 1630 is configured to perform an operation performed by the transceiver module 1510 in the foregoing embodiment.

It should be understood that the signal processing apparatus 1500 or the signal processing apparatus 1600 provided in the embodiments of this application may correspond to the network device in the foregoing method embodiments, and operations and/or functions of modules in the signal processing apparatus 1500 or the signal processing apparatus 1600 are used to implement corresponding procedures of the method described above. For brevity, details are not An embodiment of this application further provides a sequence-based signal processing apparatus. The signal processing apparatus may he a network device or a chip. The second communications apparatus may be configured to perform an action performed by the network device in the foregoing method embodiments.

Figure 17:
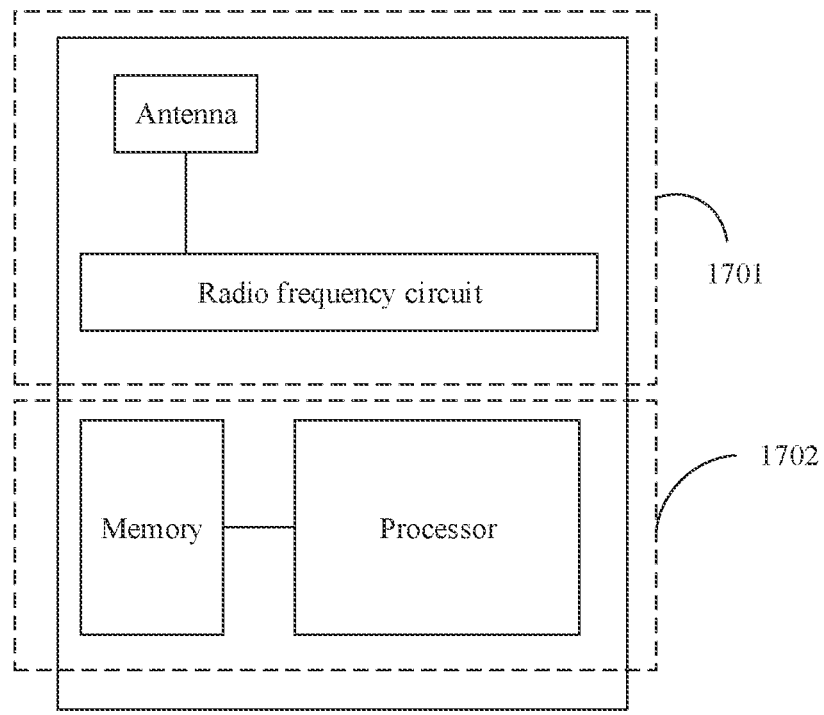
FIG. 17 is a schematic structural diagram of a network device according to an embodiment of this application.

When the signal processing apparatus is the network device, specifically, for example, a base station. FIG. 17 is a simplified schematic structural diagram of a base station. The base station includes a part 1701 and a part 1702. The part 1701 is mainly configured to: send and receive a radio frequency signal, and perform conversion between the radio frequency signal and a baseband signal. The part 1702 is mainly configured to: perform baseband processing, control the base station, and the like. The part 1701 may usually be referred to as a transceiver unit, a transceiver machine, a transceiver circuit, a transceiver, or the like. The part 1702 is usually a control center of the base station, may usually be referred to as a processing unit, and is configured to control the base station to perform an action of processing the first signal by the network device in the foregoing method embodiments. For details, refer to the foregoing descriptions of the related parts.

The transceiver unit in the part 1701 may also be referred to as a transceiver machine, a transceiver, or the like. The transceiver unit includes an antenna and a radio frequency unit. The radio frequency unit is mainly configured to perform radio frequency processing. Optionally, a component that is in the part 1701 and that is configured to implement a receiving function may be considered as a receiving unit, and a component that is configured to implement a sending function may be considered as a sending unit. That is, the part 1701 includes the receiving unit and the sending unit. The receiving unit may also be referred to as a receiving machine, a receiver, a receiving circuit, or the like. The sending unit may be referred to as a sending machine, a transmitter, a sending circuit, or the like.

The part 1702 may include one or more boards. Each board may include one or more processors and one or more memories. A processor is configured to read and execute a program in a memory, to implement a baseband processing function and control the base station. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the transceiver unit is configured to perform a receiving operation that is on a network device side and that is in step 130 in FIG. 1, and/or the transceiver unit is further configured to perform other receiving and sending steps that are on the network device side and that are in the embodiments of this application. The processing unit is configured to perform an action that is in step 140, and/or the processing unit is further configured to perform another processing step that is on the network device side and that is in the embodiments of this application.

When the communications apparatus is the chip, the chip includes a transceiver unit and a processing unit. The transceiver unit may be an input/output circuit or a communications interface. The processing unit is a processor, a microprocessor, or an integrated circuit integrated. on the chip.

Figure 18:
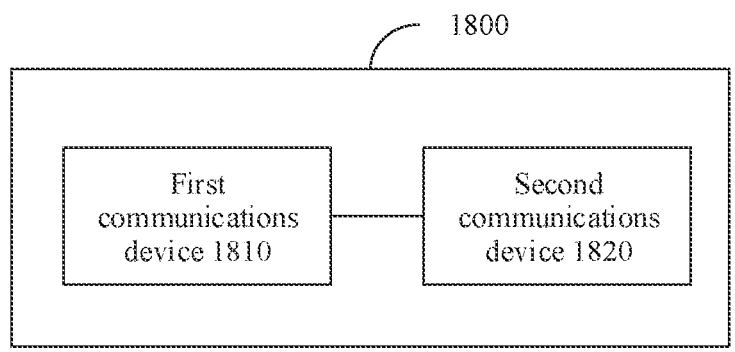
FIG. 18 is a schematic structural diagram of a communications system according to an embodiment of this application.

FIG. 18 shows a communications system 1800 according to an embodiment of this application. The communications system 1800 includes a first communications device 1810 and a second communications device 1820. The first communications device 1810 is a device on a transmitter side, For example, the first communications device 1810 is the terminal device in the foregoing method embodiments. The second communications device 1820 is a device on a receiver side. For example, the second communications device 1820 is the network device in the foregoing method embodiments.

The first communications device 1810 is configured to: determine a sequence $\{x_n\}$ including N elements, perform DFT on the N elements that are in the sequence $\{x_n\}$, to obtain a. sequence $\{f_n\}$, then map the sequence $\{f_n\}$ to N subcarriers to generate a first signal, and send the first signal to the second communications device 1820. For a description of the sequence $\{x_n\}$, refer to the foregoing description. Details are not described herein again.

The second communications device 1820 is configured to: receive the first signal sent by the first communications device 1810, obtain N elements that are in the sequence $\{f_n\}$, perform IDFT on the sequence $\{f_n\}$ to obtain the N elements that are in the sequence $\{x_n\}$, process the first signal based on the N elements that are in the sequence $\{x_n\}$.

In the foregoing communications system disclosed in this embodiment of this application, a quantity of first communications devices 1810 and a quantity of second communications devices 1820 are not limited. The first communications device 1810 may be the communications device disclosed in FIG. 12, FIG. 13, and FIG. 14. Optionally, the first communications device 1810 may be configured to perform a corresponding operation performed by the terminal device in the foregoing method embodiments. The second communications device 1820 may be the communications device disclosed in FIG. 15, FIG. 16, and FIG. 17. Optionally, the second communications device 1820 may be configured to perform a corresponding operation performed by the network device in the foregoing method embodiments. For a specific process and an execution principle, refer to the foregoing descriptions. Details are not described herein again.

For explanations and beneficial effects of related content of any of the communications apparatuses provided above, refer to the corresponding method embodiments provided above, and details are not described herein again.

It should further be understood that the "first", "second", "third", "fourth", and various digital numbers in this specification are merely for differentiation for ease of description, and are not intended to limit the scope of the embodiments of the present invention.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or may be any conventional processor or the like.

It may be understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory, The volatile memory may be a random access memory (RAM) that is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct iambus random access memory (DR RAM).

It should be noted that when the processor is a general-purpose processor, a DSP, an ASIC, an FPGA or another programmable logic device, a discrete gate or a transistor logic device, or a discrete hardware component, the memory (storage module) is integrated into the processor.

It should be noted that the memory described in this specification is intended to include but is not limited to these memories and any memory of another proper type.

A person of ordinary skill in the art may be aware that, with reference to the examples described in the embodiments disclosed in this specification, units and algorithm steps may be implemented by electronic hardware or a combination of computer software and electronic hardware. Whether the functions are performed by using hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments, and details are not described herein again.

In the several embodiments provided in this application, it should be understood that the disclosed systems, apparatuses, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, to be specific, may be located at one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the method described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A sequence-based signal processing method, comprising:
   determining a sequence $\{x_n\}$ comprising N elements, wherein N is equal to 18, $x_n$ is an element in the sequence $\{x_n\}$, the sequence $\{x_n\}$ satisfies a preset condition, the preset condition is as follows: $x_n = A \cdot b_n \cdot j^{n \bmod 2}$, a value of n ranges from 0 to N−1, wherein A is a non-zero complex number, the element $b_n = u \cdot (1 - 2 \cdot s_n)$, u is a non-zero complex number, $j = \sqrt{-1}$, $s_n$ is an element in a sequence $\{s_n\}$, the sequence $\{s_n\}$;
   $\{1, 0, 1, 1, 0, 0, 1, 0, 1, 0, 1, 0, 0, 1, 0, 0, 0, 1\}$;
   generating a first signal based on the sequence $\{x_n\}$; and
   sending the first signal.

2. The signal processing method according to claim 1, wherein the generating the first signal based on the sequence $\{x_n\}$ comprises:
   performing discrete fourier transform on the N elements that are in the sequence $\{x_n\}$, to obtain a sequence $\{f_n\}$ comprising N elements;
   respectively mapping the N elements in the sequence $\{f_n\}$ to N subcarriers, to obtain a frequency domain signal comprising N elements; and
   generating the first signal based on the frequency domain signal.

3. The signal processing method according to claim 2, wherein the N subcarriers are N consecutive subcarriers or N evenly spaced subcarriers.

4. The signal processing method according to claim 2, wherein
   before the performing discrete fourier transform on the N elements that are in the sequence $\{x_n\}$, the method further comprises: filtering the sequence $\{x_n\}$; or
   after the performing discrete fourier transform on the N elements that are in the sequence $\{x_n\}$, the method further comprises: filtering the sequence $\{x_n\}$.

5. The signal processing method according to claim 1, wherein the first signal is a reference signal of a second signal, and a modulation scheme of the second signal is π/2 binary phase shift keying (BPSK).

6. A sequence-based signal processing method, comprising:
   receiving a first signal, to obtain N elements in a sequence $\{x_n\}$, wherein N is equal to 18, $x_n$ is an element in the sequence $\{x_n\}$, the sequence $\{x_n\}$ satisfies a preset condition, the preset condition is as follows: $x_n = A \cdot b_n \cdot j^{n \bmod 2}$, a value of n ranges from 0 to N−1, wherein A is a non-zero complex number, the element $b_n = u \cdot (1 - 2 \cdot s_n)$, u is a non-zero complex number, $j = \sqrt{-1}$, $s_n$ is an element in a sequence $\{s_n\}$, the sequence $\{s_n\}$ is $\{1, 0, 1, 1, 0, 0, 1, 0, 1, 0, 1, 0, 0, 1, 0, 0, 0, 1\}$; and
   processing the first signal based on the N elements that are in the sequence $\{x_n\}$.

7. The signal processing method according to claim 6, wherein the receiving the first signal, to obtain N elements in a sequence $\{x_n\}$ comprises:
   obtaining the first signal on N consecutive subcarriers, or obtaining the first signal on N evenly spaced subcarriers;
   obtaining N elements in a sequence $\{f_n\}$, wherein N is a positive integer greater than 1, the first signal is generated by mapping the sequence $\{f_n\}$ to the N subcarriers, and $f_n$ is an element in the sequence $\{f_n\}$; and performing inverse discrete fourier transform on the sequence $\{f_n\}$, to obtain the N elements that are in the sequence $\{x_n\}$.

8. The signal processing method according to claim 6, wherein the first signal is a reference signal of a second signal, and a modulation scheme of the second signal is π/2 binary phase shift keying (BPSK).

9. An apparatus, comprising:
a transceiver;
at least one processor; and
one or more memories coupled to the at least one processor and storing programming instructions for execution by the at least one processor to cause the apparatus to:
determine a sequence $\{x_n\}$ comprising N elements, wherein N is equal to 18, $x_n$ is an element in the sequence $\{x_n\}$ the sequence $\{x_n\}$ satisfies a preset condition, the preset condition is as follows: $x_n = A \cdot b_n \cdot j^{n \bmod 2}$, a value of n ranges from 0 to N−1, wherein A is a non-zero complex number, the element $b_n = u \cdot (1-2 \cdot s_n)$, u is a non-zero complex number, $j=\sqrt{-1}$, and $s_n$ is an element in a sequence $\{s_n\}$, the sequence $\{s_n\}$ is {1, 0, 1, 1, 0, 0, 1, 0, 1, 0, 1, 0, 0, 1, 0, 0, 0, 1};
generate a first signal based on the sequence $\{x_n\}$; and
send the first signal by using the transceiver.

10. The apparatus according to claim 9, wherein the one or more memories store programming instructions for execution by the at least one processor to cause the apparatus to:
perform discrete fourier transform on the N elements that are in the sequence $\{x_n\}$, to obtain a sequence $\{f_n\}$ comprising N elements;
respectively map the N elements in the sequence $\{f_n\}$ to N subcarriers, to obtain a frequency domain signal comprising N elements; and
generate the first signal based on the frequency domain signal.

11. The apparatus according to claim 10, wherein the N subcarriers are N consecutive subcarriers or N evenly spaced subcarriers.

12. The apparatus according to claim 10, wherein the one or more memories store programming instructions for execution by the at least one processor to cause the apparatus to:
before performing discrete fourier transform on the N elements that are in the sequence $\{x_n\}$, filter the sequence $\{x_n\}$; or
the processor is configured to: after performing discrete fourier transform on the N elements that are in the sequence $\{x_n\}$, filter the sequence $\{x_n\}$.

13. The apparatus according to claim 9, wherein the first signal is a reference signal of a second signal, and a modulation scheme of the second signal is π/2 binary phase shift keying (BPSK).

14. An apparatus, comprising:
a transceiver;
at least one processor; and
one or more memories coupled to the at least one processor and storing programming instructions for execution by the at least one processor to cause the apparatus to:
receive a first signal by using the transceiver;
obtain N elements in a sequence $\{x_n\}$, wherein N is equal to 18, $x_n$ is an element in the sequence $\{x_n\}$, the sequence $\{x_n\}$ satisfies a preset condition, the preset condition is as follows: $x_n = A \cdot b_n \cdot j^{n \bmod 2}$, a value of n ranges from 0 to N−1, wherein A is a non-zero complex number, the element $b_n = u \cdot (1-2 \cdot s_n)$, u is a non-zero complex number, $j=\sqrt{-1}$, and $s_n$ is an element in a sequence $\{s_n\}$, the sequence $\{s_n\}$ is {1, 0, 1, 1, 0, 0, 1, 0, 1, 0, 1, 0, 0, 1, 0, 0, 0, 1}; and
process the first signal based on the N elements that are in the sequence $\{x_n\}$.

15. The apparatus according to claim 14, wherein the one or more memories store programming instructions for execution by the at least one processor to cause the apparatus to:
obtain the first signal on N consecutive subcarriers, or obtain the first signal on N evenly spaced subcarriers;
obtain N elements in a sequence $\{f_n\}$, wherein N is a positive integer greater than 1, the first signal is generated by mapping the sequence $\{f_n\}$ to the N subcarriers, and $f_n$ is an element in the sequence $\{f_n\}$; and
perform inverse discrete fourier transform on the sequence $\{f_n\}$, to obtain the N elements that are in the sequence $\{x_n\}$.

16. The apparatus according to claim 14, wherein the first signal is a reference signal of a second signal, and a modulation scheme of the second signal is π/2 binary phase shift keying (BPSK).

17. A non-transitory computer-readable medium, comprising instructions, that when executed by one or more processors, cause a computing device to:
determine a sequence $\{x_n\}$ comprising N elements, wherein N is equal to 18, $x_n$ is an element in the sequence $\{x_n\}$, the sequence $\{x_n\}$ satisfies a preset condition, the preset condition is as follows: $x_n = A \cdot b_n \cdot j^{n \bmod 2}$, a value of n ranges from 0 to N−1, wherein A is a non-zero complex number, the element $b_n = u \cdot (1-2 \cdot s_n)$, u is a non-zero complex number, $j=\sqrt{-1}$, and $s_n$ is an element in a sequence $\{s_n\}$, the sequence $\{s_n\}$ is {1, 0, 1, 1, 0, 0, 1, 0, 1, 0, 1, 0, 0, 1, 0, 0, 0, 1};
generate a first signal based on the sequence $\{x_n\}$; and
send the first signal.

18. A non-transitory computer-readable medium, comprising instructions, that when executed by one or more processors, cause a computing device to:
receive a first signal, to obtain N elements in a sequence $\{x_n\}$, wherein N is equal to 18, $x_n$ is an element in the sequence $\{x_n\}$, the sequence $\{x_n\}$ satisfies a preset condition, the preset condition is as follows: $x_n = A \cdot b_n \cdot j^{n \bmod 2}$, a value of n ranges from 0 to N−1, wherein A is a non-zero complex number, the element $b_n = u \cdot (1-2 \cdot s_n)$, u is a non-zero complex number, $j=\sqrt{-1}$, and $s_n$ is an element in a sequence $\{s_n\}$, the sequence $\{s_n\}$ is {1, 0, 1, 1, 0, 0, 1, 0, 1, 0, 1, 0, 0, 1, 0, 0, 0, 1}; and
process the first signal based on the N elements that are in the sequence $\{x_n\}$.

* * * * *

UNITED STATES PATENT AND TRADEMARK OFFICE
CERTIFICATE OF CORRECTION

PATENT NO. : 12,028,199 B2
APPLICATION NO. : 17/361720
DATED : July 2, 2024
INVENTOR(S) : Xianda Liu et al.

It is certified that error appears in the above-identified patent and that said Letters Patent is hereby corrected as shown below:

On the Title Page

In Column 2 (item (57) Abstract), in Line 4, Delete "18" and insert -- 18, --.

In the Claims

In Column 26, In Line 15, In Claim 1, delete "$\{s_n\}$;" and insert -- $\{s_n\}$ --.

In Column 27, In Line 19, In Claim 9, delete "$b_{n\cdot j}^{n}$" and insert -- $b_n \cdot j^n$ --.

Signed and Sealed this
Fifth Day of November, 2024

Katherine Kelly Vidal
*Director of the United States Patent and Trademark Office*